(12) United States Patent
Erickson

(10) Patent No.: US 7,047,241 B1
(45) Date of Patent: May 16, 2006

(54) SYSTEM AND METHODS FOR MANAGING DIGITAL CREATIVE WORKS

(75) Inventor: John S. Erickson, Norwich, VT (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 08/731,291

(22) Filed: Oct. 11, 1996

Related U.S. Application Data

(63) Continuation-in-part of application No. 08/543,161, filed on Oct. 13, 1995, now Pat. No. 5,765,152.

(60) Provisional application No. 60/025,485, filed on Aug. 29, 1996.

(51) Int. Cl.
*G06F 17/30* (2006.01)

(52) U.S. Cl. .............................. 707/9; 707/10; 713/176; 713/168; 713/161; 380/277; 380/278

(58) Field of Classification Search ....................... None
See application file for complete search history.

(56) References Cited

U.S. PATENT DOCUMENTS

| | | | | |
|---|---|---|---|---|
| 4,218,738 A | | 8/1980 | Matyas et al. ............... | 364/200 |
| 4,528,588 A | | 7/1985 | Lofberg ...................... | 340/5.1 |
| 4,528,643 A | | 7/1985 | Freeny ....................... | 364/900 |
| 4,827,508 A | | 5/1989 | Shear .......................... | 380/4 |
| 4,888,798 A | | 12/1989 | Earnest ........................ | 380/4 |
| 4,890,223 A | * | 12/1989 | Cruess et al. ................ | 711/207 |
| 4,941,175 A | | 7/1990 | Enescu et al. ................ | 380/4 |
| 4,977,594 A | | 12/1990 | Shear ............................ | 380/4 |
| 4,999,806 A | | 3/1991 | Chernow et al. ............ | 364/900 |
| 5,023,907 A | | 6/1991 | Johnson et al. .............. | 380/4 |
| 5,050,213 A | | 9/1991 | Shear .......................... | 380/25 |

(Continued)

OTHER PUBLICATIONS

U.S. Appl. No. 09/585,727, filed May 31, 2000, Erickson.
U.S. Appl. No. 09/337,637, filed Jun. 21, 1999, Erickson.
Sibert et al., "DigiBox: A Self–Protecting Container for Information Commerce," Electronic Publishing Recourses, Inc., originall published in the Proceeding of the First USENIX Workshop on Electronic Commerce, Jul. 1995.
"Technological Strategies for Protecting Intellectual Property in the Networked Multimedia Environment," The Journal of the Interactive Multimedia Association Intellectual Property Project Proceedings, Jan. 1994, vol. 1, Issue 1, pp 1–264 plus six pages in preface.
Erickson, "A Copyright Management System for Networked Interactive Multimedia," Proc. of the Dartmouth Institute for Advanced Graduate Studies (DAGS'95), Jun., 1995.

(Continued)

*Primary Examiner*—Jean M. Corrielus

(57) ABSTRACT

Digital Creative Works such as copyrighted electronic media are packaged in a secure electronic format, or CONTAINER, and registered on associated registration server, which serves to provide on-line licensing and copyright management for that Work. Users are connected to the registration server through a computer network or the Internet to enable data transfers and to transact licenses to utilize the media. Packaged electronic media are typically created by an author or derivative user of the work. Once the packaged media is registered on the server, the media is made available for limited use and possible license through an authorization server. This limited use is specified within the minimum permissions data set assigned to each packaged media. Without a license, users are typically permitted to view the packaged media—through a system which unpackages the media—but cannot save, print or otherwise transfer the media without obtaining auxiliary permissions to do so from the authorization server. The electronic media is authenticated through digital signatures and optional encryption.

3 Claims, 18 Drawing Sheets

U.S. PATENT DOCUMENTS

| | | | |
|---|---|---|---|
| 5,103,476 A | 4/1992 | Waite | 705/59 |
| 5,113,518 A | 5/1992 | Durst et al. | 395/550 |
| 5,138,712 A | 8/1992 | Corbin | 395/700 |
| 5,182,770 A | 1/1993 | Medveczky et al. | 380/4 |
| 5,319,705 A | 6/1994 | Halter | 705/54 |
| 5,321,841 A | 6/1994 | East | 709/107 |
| 5,410,598 A | 4/1995 | Shear | 380/4 |
| 5,428,731 A | 6/1995 | Powers, III | 707/501 |
| 5,464,997 A | 11/1995 | Watanabe | 257/239 |
| 5,473,692 A | 12/1995 | Davis | 380/25 |
| 5,495,411 A | 2/1996 | Ananda | 364/401 |
| 5,544,302 A * | 8/1996 | Nguyen | 345/837 |
| 5,548,645 A | 8/1996 | Ananda | 380/4 |
| 5,553,143 A | 9/1996 | Ross et al. | 380/25 |
| 5,579,479 A | 11/1996 | Plum | 395/188.01 |
| 5,613,004 A | 3/1997 | Cooperman | 380/28 |
| 5,617,119 A | 4/1997 | Briggs et al. | 345/611 |
| 5,629,980 A | 5/1997 | Stefik et al. | 380/4 |
| 5,634,012 A | 5/1997 | Stefik et al. | 705/39 |
| 5,634,129 A * | 5/1997 | Dickinson | 719/315 |
| 5,636,276 A | 6/1997 | Brugger | 380/4 |
| 5,638,443 A | 6/1997 | Stefik et al. | 380/4 |
| 5,646,997 A | 7/1997 | Barton | 380/23 |
| 5,646,999 A | 7/1997 | Saito | 380/25 |
| 5,652,714 A | 7/1997 | Peterson et al. | 702/57 |
| 5,657,462 A | 8/1997 | Brouwer et al. | 395/336 |
| 5,699,526 A | 12/1997 | Siefert | 395/227 |
| 5,715,403 A | 2/1998 | Stefik | 395/244 |
| 5,734,119 A | 3/1998 | France et al. | 84/622 |
| 5,734,719 A | 3/1998 | Tseydos | 380/5 |
| 5,745,569 A | 4/1998 | Moskowitz et al. | 380/4 |
| 5,748,956 A | 5/1998 | Lafer | 395/615 |
| 5,765,152 A | 6/1998 | Erickson et al. | 707/9 |
| 5,801,687 A | 9/1998 | Peterson et al. | 345/302 |
| 5,822,432 A | 10/1998 | Moskowitz et al. | 380/28 |
| 5,828,485 A | 10/1998 | Hewlett | 359/291 |
| 5,845,281 A | 12/1998 | Benson | 707/9 |
| 5,848,424 A | 12/1998 | Scheinkman et al. | 707/501 |
| 5,852,673 A | 12/1998 | Young | 382/164 |
| 5,915,019 A | 6/1999 | Ginter | 705/54 |
| 5,920,861 A | 7/1999 | Hall et al. | 707/9 |
| 5,920,878 A | 7/1999 | DeMont | 707/513 |
| 5,926,822 A | 7/1999 | Garman | 707/503 |
| 5,940,504 A | 8/1999 | Griswold | 705/59 |
| 5,974,141 A | 10/1999 | Saito | 705/52 |
| 5,983,218 A | 11/1999 | Syeda-Mahmood | 707/3 |
| 5,991,876 A | 11/1999 | Johnson et al. | 713/200 |
| 5,995,625 A | 11/1999 | Sudia | 705/51 |
| 6,182,218 B1 | 1/2001 | Saito | 713/176 |
| 6,185,683 B1 | 2/2001 | Ginter | 713/176 |
| 6,226,618 B1 | 5/2001 | Downs et al. | 705/1 |
| 6,233,684 B1 | 5/2001 | Stefik | 713/176 |
| 6,236,971 B1 | 5/2001 | Stefik | 705/1 |
| 6,398,245 B1 | 6/2002 | Gruse | 280/228 |
| 2001/0008557 A1 | 7/2001 | Stefik | |
| 2001/0026618 A1 | 10/2001 | Van Wie | |
| 2001/0042043 A1 | 11/2001 | Shear | |
| 2002/0002468 A1 | 1/2002 | Spagna | |
| 2002/0007456 A1 | 1/2002 | Peinado | |
| 2002/0048369 A1 | 4/2002 | Ginter | |
| 2002/0059238 A1 | 5/2002 | Saito | |
| 2002/0107803 A1 | 8/2002 | Lisanke | |
| 2002/0112171 A1 | 8/2002 | Ginter | |

OTHER PUBLICATIONS

Erickson, "Can Fair Use Survive Our Information-based Future," Dartmouth Interactive Media Lab Technical Report, 1995.

"Evaluation of Competitive Technologies: Other Players in the Rights Management Industry," Netrights © 1996 NetRights, LLC.

Griswold, "A Method of Protecting Copyrights on Networks," Proc. Technological Strategies for Protecting Intellectual Property in the Networked Multimedia Environment, 1994.

Perritt. Technological Strategies for Protecting Intellectual Property in the Networked Multimedia Environment, 1994.

Upthegrove, "Intellectual Property Header Descriptors: A Dynamic Approach," Proc. Technological Strategies for Protecting Intellectual Property in the Networked Multimedia Environment, 1994.

Erickson, "Enhanced Attribution for Networked Copyright Management," A Thesis Submitted to the Faculty in partial fulfillment of the requirements for the degree of Doctor of Philosophy, Thayer School of Engineering, Dartmouth College, Hanover, NH, Jun. 1997 (233 pgs).

* cited by examiner

License Agreement

Registry:
Rights Holder:
Authorized Licensee:
Permissions Granted by this Agreement:

Terms of this Agreement:

[ Cancel ]　　　　　　　　　　　　　　[ I Hereby Agree ]

FIG. 7c

Registry Info

Registry:
Rights Owner:
User Classes Available : [ General ▽ ]
Comments:

Permissions Available for General:

Licensing Terms for General:

[ Cancel ]　　　　　　　　　　　　　　[ Request Permissions ]

FIG. 7d

| Third Party Application - Actions | VIEWER and/or PACKAGER Actions | Authorization Server Actions | Registration Server Actions |
|---|---|---|---|
| CONTAINER Opened | | | |
| | VIEWER views CONTAINER attributes, including minimum and auxiliary permissions, if any | | |
| | Authorization server contacted if required | | |
| | | Compare requested permissions and user class with rule base | |
| | | Grant appropriate auxiliary permissions and issue encrypted certificate | |
| Viewer or editor opened for packaged data type | | | |
| Attempt unauthorized action | If editing, initialize local list of active source works | | |
| Prepare request for required permissions | | | |
| | Contact authorization server for auxiliary permissions | | |
| | | Compare requested permissions and user class with rule base | |
| | | Grant appropriate auxiliary permissions and issue encrypted certificate | |
| Perform desired action | | | |
| Import CONTAINER | | | |
| | Contact authorization server on opening, if required | | |
| | Add new work to Source Works list | | |
| Attempt file save | | | |
| | Examine clearances (minimum and auxiliary permissions) of source works | | |
| | Initiate authorization requests for uncleared works | | |
| | | Grant appropriate auxiliary permissions and issue encrypted certificate | |
| Move data to Packager | | | |
| | Assemble based upon data to be saved | | |
| | Select server and generate registration request | | |
| | | | Grant registration request (used for final signature) |
| | Complete CONTAINER packaging | | |

SYSTEM AND METHODS FOR MANAGING DIGITAL CREATIVE WORKS

RELATED APPLICATIONS

This application is a continuation-in-part of U.S. patent application Ser. No. 08/543,161, entitled "System and Methodology for Protecting Copyrighted Electronic Media," filed on Oct. 13, 1995 now U.S. Pat. No. 5,765,152, and is a continuing application of Provisional Application No. 60/025,485, filed on Aug. 29, 1996, both of which are expressly incorporated herein by reference.

BACKGROUND OF THE INVENTION

The management of copyrighted material in the prior art is largely based upon hard copy technology, which attaches attribution and notification to creative works, such as copyright notices, by lines and credits. This technique is prone to significant error because notices become outdated, removed and/or ignored. Further, any copyright violation of the hard copy creative work—such as physical, unlawful copying of an article on a copying machine—is difficult to determine.

Digital media exacerbate these problems. Specifically, copyright infringement and theft has increased enormously in the computer age, particularly with respect to information data transfers through the Internet. Further, electronic email and the communication and connectivity of local and wide area networks (LANs and WANs, respectively) have facilitated unauthorized use of copyrighted materials by permitting tagging and/or enclosing of almost any electronic media, such as application software, authored text files and graphics, and musical sounds.

On-line services such as Compuserve™ and America Online™ do provide some measure of copyright protection by assessing on-line charges to the access of protected databases and to the download of selected files. However, there is little to prevent that on-line user from retransmitting any downloaded files to another user connected on the Internet. If the user is also connected to a network, those downloaded files are also subject to remote access from yet another unauthorized user.

The problems associated within electronic copyright infringement are well known, particularly by those parties injured by the unauthorized use of copyrighted materials. For example, the unauthorized copying of copyrighted magnetic diskettes, and the electronic email and tagging and/or enclosing of copyrighted files can result in a direct monetary loss to the owner of the copyrighted works, in addition to an unaccounted for gain for the unauthorized user. With the expansion of the Internet and other computerized networks, the aggregate amount of such losses and gains is substantial.

Even the U.S. Commerce Department recognizes that serious copyright problems exist with the burgeoning growth of electronic data transfers between networked computers and particularly through the Internet. Early in September 1995, for example, the Commerce Department issued a white paper entitled "Intellectual Property and the National Information Infrastructure." The paper highlights the need to protect copyrighted information that is resident in cyberspace, where unauthorized users can copy original works of authorship, including movies and books, by pressing a couple of keystrokes. See, V. Sussman, *Copyright wrong? A fight brews over who gets to own the future (cyberspace)*, U.S. News & World Report, Sep. 18, 1995, v119 n11 p99(1).

In the prior art, methods have been developed to enhance copyright protection of electronic media. For example, AT&T Bell Laboratories has developed a system which makes tiny adjustments to the spacing between words so that every copy of a document utilizing the system is "unique." These electronic adjustments are detectable by computers only because they are too small for the human eye to notice. By way of another example, Digimarc, a company in Portland, OR, recently announced a system that encodes data into an image by carefully adjusting the digital representation of individual pixels. As in the AT&T system, the encoded data is not noticeable to the eye and enables some traceability of unauthorized copyright uses. See, S. Steinberg, editor of Wired Magazine, Los Angeles Times column, p2, part D, Aug. 31 (1995).

However, such systems operate only to detect unauthorized usage of copyrighted works in digital form. They do not manage the access to copyrighted works, nor do they provide any systematic way of controlling the rights to copyrighted electronic media.

More particularly, the tracing of copyright clearances to users of copyrighted electronic media in the prior art is a tedious and often impossible task. Specifically, authors and multimedia developers have had only two practical methods for protecting their copyrights of electronic works: one method is to rely upon copyright laws and international treaties to prohibit unauthorized use of the media; and the other is to encrypt the data, so that access is restricted to those users with a decryption key.

In the first method, media developers typically do nothing; or they attach a textual copyright warning—sometimes called a "watermark"—to the media. This type of "protection" ensures free access to the media, but it works only for those honest users and derivative developers who view the work and decide whether they want to license it. However, users and developers of such media cannot be sure of the authorship or integrity of the media. Authenticity is thus sometimes increased by restricting access to the media, such as through the use of a password. By way of example, a password-protected World Wide Web page provides some measure of authenticity, but also discourages the open and free propagation of the information in the media.

In the second method, media developers can utilize powerful encryption tools, readily available in the public domain, such as those tools based on the RSA public key algorithm (Rivest, Shamir, & Adleman, 1977). However, the use of encryption to protect copyrights only serves to restrict access to the information within the media, like the password described above. Moreover, after the work is decrypted on the recipient's computer, the problems of copyright heritage and permissions for derivative development and use of the media remain.

These two methods favor either the user or the owner of the media. In the first method, for example, there is no electronic protection coupled to the media; and it thus favors the free and fair use of the media at the expense of the owners' rights. On the other hand, the second method of encryption favors the owners' rights, at least to a degree. Neither method affords both fair use and ownership protection; and neither provides for automatic management of media rights, including the controlled access to media in derivative works. Further, these methods do not intervene in managing copyrights, and are beneficial only after the copyright issue becomes a problem.

OBJECTS OF THE INVENTION

It is one object of the invention to provide systems and methodologies to protect the rights of intellectual property owners while promoting open and free sharing of information.

Another object of the invention is to provide methods for ensuring that benefits owed to owners, publishers and creators of creative works accrue to such entities.

Still another object of the invention is to provide methods and systems for crediting authors, publishers and creators of electronic multimedia objects that include digital creative works.

Other objects of the invention provide tools to acquire, publish, distribute, and disseminate multimedia objects to strengthen ownership and attribution of the underlying digital creative work.

Another object of the invention provides systems and methods for packaging and unpackaging digital creative works within a data container to facilitate the management of that work.

Another object of the invention provides systems and methods for attaching copyright notices and other attributes to digital creative works.

Other objects of the invention provide for (a) locating source works of derivative authors of digital creative works, (b) obtaining releases and permissions to incorporate another work or part of another work into the digital creative work, (c) determining the source and attributes of digitally creative works, (d) promotion of communication directly to the author or owner of the digital works, (e) security and authentication of transactions and the digital work, and (f) the automation of rights management, such as acquisition, administration, and authorization of digital creative works.

It is still another object of the invention to provide systems and methodologies to manage copyrighted electronic media, thereby solving or reducing the problems of the prior art.

Yet another object of the invention is to provide a method for maintaining an electronic bibliographic record of successive data transfers of protected electronic media.

Still another object of the invention provides systems and methods for packaging and unpackaging electronic media within an electronic container to facilitate the management of copyrighted electronic media.

These and other objects of the invention will be apparent from the description which follows.

SUMMARY OF THE INVENTION

As used herein, a "copyrighted work" means any work that is authored and protected by U.S. and international copyright laws, including, without limitation, literary works; musical works, including any accompanying words; dramatic works, including any accompanying music; pantomimes and choreographic works; pictorial, graphic, and sculptural works; motion pictures and other audiovisual works; sound recordings; and architectural works. "Electronic media" means any electronic form or digital representation of a copyrighted work.

As used herein, a "Digital Creative Work" means any electronic media, multimedia content element, electronic creative work, and in particular work such as authored and protected by U.S. and international copyright laws, including, without limitation, any of the following in digital or electronic form: literary works; musical works, including any accompanying words; dramatic works, including any accompanying music; pantomimes and choreographic works; pictorial, graphic, and sculptural works; motion pictures and other audiovisual works; sound recordings; and architectural works. Further, a Digital Creative Work can include multimedia content elements that have two or more creative works, such as a digital image and associated digital audio. As such, a Digital Creative Work includes any electronic form or digital representation of a copyrighted work, including multimedia objects, and including any form or digital representation (1) stored within computer memory or other electronic memory, (2) resident on CD-ROM and/or magnetic disk or tape, (3) transmitted as a digital file through email, an on-line service such as Compuserve™, the World Wide Web (WWW), Intranet and/or the Internet; and (4) communicated as a digital file within or into a computer network, such as a LAN or WAN, and including any communication obtained through remote access. Further, a Digital Creative Work can include, but is not limited to, digital embodiments of a creative expression, such as digital audio (eg: WAV, SND, AIFF, AU), digital music sequences (eg: MIDI), digital video (eg: AVI, MOV, MPEG), digital images and graphics (eg: GIF, BMP, TIFF, JPEG, FlashPix), word processing files (eg: DOC), and spreadsheet files (eg: XLS).

As used herein, "CONTAINER" means an electronic or digital entity that is constructed according to the invention to enable the use of, control of, access to, and/or licensing of the Digital Creative Work. The CONTAINER is a logical entity that is preferably based on object technology such as C, C++, Visual Basic, Microsoft's ActiveX™ Controls, Microsoft's OLE™ Controls, Apple's OpenDoc™, and Sun Microsystem's Java™ applet component technologies. Accordingly, a CONTAINER of the invention is a data container that includes a data portion with the Digital Creative Work, and an executable portion that typically adds functionality to Web Sites, desktop applications and development tools in order to manage that Digital Creative Work. A CONTAINER can be distributed through many channels, such as through the Internet, CD ROM, or magnetic media. Further, a CONTAINER can be formed of different parts that are located remotely to one another; though the different parts are linked to maintain attribution within the CONTAINER.

As used herein, "METADATA" refers to data associated or encapsulated with a CONTAINER and includes a plurality of data pertinent to copyright management, including, for example, ownership identification and contact information, rights administration identification and contact information, creatorship identification and contact information, an identification and address of a registration server, listings of antecedent and related objects, and licensing terms and conditions.

As used herein, a "DIGITAL CONTRACT" means a contract secured through licensing activity between a registration server and a user of a Digital Creative Work. The Digital Contract includes a textual expression of enhanced permissions for use of the Digital Creative Work and may or may not be accompanied by an upgrade of the operational controls such as the ability to print, save and/or edit the Digital Creative Work.

As used herein, "SYSTEM EXTENSION" means an operating system extension or "plug-in" that each user obtains prior to use and/or manipulation of one or more CONTAINERs. Specifically, the SYSTEM EXTENSION operates in conjunction with the operating system of a computer to recognize CONTAINERs and to permit authorized operations on the CONTAINER's METADATA and/or Digital Creative Works. When needed, the EXTENSION can and will be downloaded from various trusted locations and such as described herein so as to render Digital Creative Works within CONTAINERS. However, the EXTENSION is generally resident on a user's computer so as to obviate the need to continually download the EXTENSION and to improve network efficiency.

As used herein, "OBJECT" means an instantiation such as an icon, graphic or other visual, on a computer, which is, or which refers to, or which points to an object such as a CONTAINER. Typically, an OBJECT is viewable within an application such as a Web browser such that a user directly views authorized content of the Digital Creative Work. However, for example, a user can select or "click" the OBJECT with a computer mouse to gain additional information in and to the CONTAINER and/or to obtain additional licenses to the OBJECT's Digital Creative Works. The OBJECT thus instantiates the existence of the Digital Creative Work in a composition such as a CONTAINER. In the usual case, for example, a Digital Creative Work within a CONTAINER is actually an image (i.e., the "OBJECT") on a user's computer. In the preferred embodiment of the invention, the user will view an OBJECT and not notice anything different about the Digital Creative Work until the user tries to operate on the OBJECT in ways that are prohibited. For example, when a user attempts to click on the OBJECT, or to print the OBJECT, or to copy the OBJECT to another file, or to attempt other operations that are restricted, the EXTENSION takes over and informs the user that such operations are prohibited without an additional license to the Digital Creative Work. An OBJECT can be formed of a group of OBJECTS. Once permissions or licenses are granted to perform additional operations, such as copying, the DIGITAL CREATIVE WORK and META-DATA remain linked during the copying process so that the user copies the CONTAINER, preserving attribution and facilitating the further management of the Digital Creative Work. It is important to note that an OBJECT instantiates a CONTAINER which itself can exist locally, e.g., within internal memory, and/or remotely across one or more sites on the Internet. The invention communicates an OBJECT to a user through a file or a continuous data stream: in the first case, the OBJECT is rendered to the user after the complete data set is received; and in the second case the OBJECT is rendered as the data is received through the communication link.

As used herein, "TOOL BOX" or "TOOLBOX" means a software application that is used to create or augment a CONTAINER. Typically, the TOOL BOX is resident on a computer to facilitate the management of Digital Creative Works from the author or creator's desktop computer.

As used herein, "PACKAGER" means an application which creates or augments a CONTAINER. Typically, the PACKAGER operates in a batch mode and is used in high-volume generation of CONTAINERs for creators and owners of large amounts of digital creative works. By way of another example, the PACKAGER can package HTML documents, i.e., Web pages, so that a user of the Web page is actually within an OBJECT that is likely composed of other OBJECTs.

As used herein, a "VIEWER" refers to software and/or hardware which renders the Digital Creative Work of a CONTAINER to a user. For example, a CONTAINER can be associated with a web page that is accessed by users of the Internet. In order to perceive the CONTAINER, and in particular the Digital Creative Work associated with the CONTAINER, the user's host computer calls on the appropriate media "viewer" service registered with the computer's operating system. If the Digital Creative Work is, for example, a GIF file, the computer tells the SYSTEM EXTENSION to do the rendering and the SYSTEM EXTENSION, in turn, calls on a GIF viewer or renderer to display the GIF (i.e., the Digital Creative Work in this example) to the user. Similarly, a VIEWER can refer to rendering software of JPEGs, AVIs, PDFs, MIDs, etc. Indirectly, the VIEWER is sometimes embodied with the SYSTEM EXTENSION or as separate software specific to the invention so as to render, for example, a Digital Contract. More particularly, when asked by the user (e.g., with the "click" of a computer mouse), the EXTENSION renders the associated Digital Creative Works with a VIEWER specifically designed to view the Digital Contract. The VIEWER also refers to a computer subsystem, operable by a user desiring to manipulate one or more CONTAINERs that contain either (a) a shell extension which responds to direct manipulation, at the computer, of OBJECTS referring to CONTAINERS, or (b) an object control, which is used to display CONTAINERS—or portions of CONTAINERS— within other applications. By way of example, an object control of the invention can include ActiveX Control that permits display of an OBJECT, within an application such as a web browser, that links the computer to the CONTAINER.

As used herein, "REGISTRY" generally refers to a registration server that registers CONTAINERS and which operates to manage Digital Creative Works. A user of a particular CONTAINER communicates to the REGISTRY via on-line communication to obtain auxiliary permissions to the Digital Creative Work therein. The CONTAINER contains information in the METADATA which specifies the "home" or licensing site assigned to the CONTAINER. By way of example, when a user clicks on an OBJECT to request auxiliary use of the Digital Creative Work, the CONTAINER automatically prompts the EXTENSION to locate and connect with the assigned REGISTRY through Internet communication. In certain aspects of the invention, the REGISTRY includes a separate registration server and an authorization server. The registration server is used to register CONTAINERs, and the authorization server is used to authorize auxiliary uses of CONTAINERs, such as to provide licensing to the Digital Creative Works therein. However, the REGISTRY is typically a single registration server that operates as a registration server and as an authorization server to negotiate licenses with on-line users of Digital Creative Works.

In one aspect, the invention applies object technology to the Digital Creative Work to form a data CONTAINER including the data content of the Digital Creative Work and other attributes contained in METADATA. These attributes can include operations, services and information that describe or operate on the METADATA and/or Digital Creative Work as appropriate to the user according to the minimum and/or auxiliary permissions granted within the METADATA. In another aspect, the attributes and content of a CONTAINER are distributed between (a) the local system, i.e., where a user views and/or manipulates the CONTAINER, and (b) a registration server to which it refers across the Internet. The registration server further can contain attributes that, for various reasons such as volatility, security, or efficiency, cannot or should not travel to the local system.

In another aspect, a repository system provides file images, i.e., persistence data, of CONTAINERS as well as resources and data referred to by CONTAINERS but not held in attributes at the registration server.

In one aspect of the invention, a user at a computer accesses a particular CONTAINER through a set of property pages (e.g., tabbed dialog boxes), or "templates," that are available through the CONTAINER wherever it appears. For example, where an OBJECT for a CONTAINER appears in a screen rendering of a Web browser, a mouse click onto the OBJECT brings up its associated property pages to show information and to provide access to features such as email and authentication to the associated digital creative work In still another aspect, and as described herein, creators or authors of digital creative works bind content and attributes into a CONTAINER; and register new CONTAINERS through a locally resident TOOL BOX which facilitates the flexible design of the CONTAINER's property pages and feature selections. In still another aspect, the TOOL BOX also automates the organization and maintenance of the heritage of the Digital Creative Work, such as when the CONTAINER includes works from various authors.

In another aspect, one or more CONTAINERS can be, and preferably are, registered at the REGISTRY, which preferably is a secured registration server system remote from the viewing capabilities of the SYSTEM EXTENSION or VIEWER. In this aspect, the REGISTRY (a) retains information to validate the credentials and/or authenticity of a TOOL BOX, attempting to register a work, or a CONTAINER; and (b) supplies remote services and data. The REGISTRY can also supply attribute data obtained indirectly from a content provider's existing legacy database.

In accord with preferred aspects of the invention, access to OBJECTS is generally "open" such that any user can view the associated Digital Creative Work. The SYSTEM EXTENSION in this aspect is thus ubiquitous, as are most or all supplementary VIEWERS. That is, when a VIEWER is called by the EXTENSION, the invention preferably utilizes handshaking standard such as Microsoft's code signing standard. Such a standard uses digital signature technology that helps one application make sure that it is talking to the authentic version of another application. Accordingly, the SYSTEM EXTENSION in this aspect is sure to call the correct VIEWER and not some other viewer that does damage to the DIGITAL WORK or CONTAINER.

In one aspect, the invention provides a method of packaging a digital creative work, including the steps of: encapsulating the work within a data container; encapsulating metadata within the container; and integrating, with the container, means for accessing the work and the metadata. In another aspect, the step of integrating further comprises the step of integrating, with the container, means for rendering the work. The method can also include any of the following steps: integrating, with the container, means for printing the work; integrating, with the container, means for copying the work; integrating, with the container, means for viewing the work; integrating, with the container, means for controlling use of the work; integrating, with the container, means for limiting use of the work; integrating, with the container, means for disallowing use of the work; integrating, with the container, means for operating on the metadata; integrating, with the container, means for providing email to one or more external addresses; integrating, with the container, means for providing web access to one or more WWW addresses; integrating, with the container, means for providing interactive licensing to the work; integrating, with the container, means for providing a link to a digital contract for the work; integrating, with the container, means for updating the metadata; and integrating, with the container, means for displaying descriptive information.

The descriptive information can include one or more of the following: authorship information, historical information, ownership information, date information, time information, and bibliographic information. It can further include a digital signature to verify authenticy of the work.

The method of the invention can also include the step of forming the data container as a plurality of associated data that are distributed across one or more of the following: a computer network, the Internet, a LAN, a WAN, an on-line service, and an Intranet. Further, the work can be selected from the group of digital images and graphics, digital photos, digital audio, digital video, digital music sequences, word processing files, spreadsheet files, and mixtures thereof. For example, the digital images and graphics can include JPEG, GIF, BMP, TIFF and mixtures thereof. Similarly, the digital audio can include WAV, SND, AIFF, AU and mixtures thereof. Further, the digital music sequence can include MIDI; and the digital video can include AVI, MOV, MPEG and mixtures thereof. The word processing programs can include, among others, Microsoft Word™, Novell WordPerfect™ and mixtures thereof. Likewise, the spreadsheet programs can include, among others, Microsoft Excel™.

The step of encapsulating metadata can include the step of encapsulating copyright management information. The copyright management information can include any of ownership identification information, ownership contact information, rights administration information, rights administration contact information, creatorship information, authorship information, creator contact information, author contact information, listings of antecedent object information, listings of related object information, licensing terms, licensing conditions, publisher information, and ownership credits. These can further include email addresses, web access addresses, and mixtures thereof. The step of encapsulating metadata can further include the step of encapsulating registration data, the registration data identifying an associated registration server capable of administrating the data container.

Preferably, the metadata is modifiable and accessible through on-line communication with the registration server. Accordingly, the method can include the step of storing at least part of the metadata at a database of the registration server, or the step of down-loading at least part of the metadata from the registration server.

The methods of the invention can also include the step of providing a user interface to the data container to review at least part of the metadata on a computer. The user interface is preferably displayable on the computer and is selectable by a user of the computer to modify information therein.

In another aspect, the step of encapsulating metadata further includes the step of encapsulating, with the data container, minimum permissions data, the minimum permissions data specifying one or more operations that can be performed on the work without a license to the work.

In still another aspect, the step of encapsulating metadata further includes the step of encapsulating with the data container, minimum permissions data, the minimum permissions data specifying a default contract to the work, the default contract specifying a minimum set of operations that can be performed by applications on the work. Such operations, for example, include drag and drop operations, printing operations, editing operations, activating operations, saving operations, and viewing operations.

The step of integrating means for accessing the work and the metadata can include the step of integrating, with the container, one or more of the following: means for encoding the metadata, means for compressing the metadata, means for manipulating the metadata, means for encrypting the metadata, means for decoding the metadata, and means for decrypting the metadata. Similarly, the step of integrating means for accessing the work and the metadata can include the step of integrating, with the container, one or more of the following: means for encoding the work, means for compressing the work, means for manipulating the work, means for encrypting the work, means for decoding the work, and means for decrypting the work.

In another aspect, the step of encapsulating the work further includes the step of encrypting the work. Alternatively, the step of encapsulating metadata can include: the step of associating a metadata template with the container, the metadata template describing registration with a registration server; or the step of associating a metadata template with the container, the metadata template specifying properties of the container used to register the container with a registration server. A further step can include specifying, within the template, a display interface used to view the properties.

In another method of the invention, the step of encapsulating metadata includes the step of associating a metadata template with the container, the metadata template identifying user-selectable optional properties of the container. Further, the step of encapsulating metadata can include the step of associating a metadata template with the container, the metadata template specifying requirements and rules associated with the work.

Certain aspects of the invention include providing, with the metadata template, a user interface suitable for viewing information related to the metadata and the work; and/or providing different metadata templates corresponding to different types of works; and/or providing different metadata templates corresponding to different licensing models.

One method of the invention includes, with the step of encapsulating metadata, the step of associating, with the container, operations that can be performed on the work.

In still another aspect, each registration server provides on-line administration of the container and has user-selectable registration templates for associating metadata with the container, at least part of the metadata being modifiable over a lifetime of the container.

Further, the step of encapsulating metadata can include the step of associating, with the container, requirements of specific parties having rights in or to the work. The requirements can include a requirement to obtain a license to the work prior to additional use of the work. The requirements can also include a requirement of obtaining information about entities desiring access to the work. Such information can include address and billing information of the entities. The entities can include one or more of an individual, a partnership, a company, a government agency, and an educational institution.

In another aspect, the step of encapsulating metadata can include the step of encapsulating information indicative of one or both of an owner and creator of the media, and further include the step of communicating with one or both of the owner and creator through one or both of email and web page access. The steps of encapsulating can be made through object-based technology. Typically, the container is formed with object-based technology such as of OLE™, ActiveX™, OpenDoc™, and hybrid OLE™/OpenDoc™.

The invention also provides a method of accessing a digital creative work, including: installing a system extension onto a computer, the extension including (i) means for operating in conjunction with an operating system controlling the computer; (ii) means for accessing a data container having the work and metadata, including minimum permissions data, attached thereto, the minimum permissions data specifying one or more operations that can be performed on the work without a license to the work; and (iii) means for recognizing the minimum permissions data and for enabling a user of the computer to use the work in accord with the specified operations; and accessing the container and using the work in accord with the specified operations.

The step of installing a system extension can include the step of distributing the extension to the computer with a computer operating system; and/or the step of distributing the extension to the computer from one or more content provider sites, the content provider sites creating the media; and/or distributing the extension to the computer with creativity tools; and/or utilizing image and graphic creativity tools selected from the group of Adobe Photoshop™, Fractal Design Painter™, CorelDraw; and/or utilizing multimedia authoring tools selected from the group of Macromedia Director™, Macromedia Authorware™, Asymetrix Toolbook™, Aimtech IconAuthor™; and/or utilizing web authoring tools selected from the group of Microsoft FrontPage™, Adobe PageMill™, Adobe SiteMill™, SoftQuad HoTMetaL Pro™, Corel Web.Designer™; and/or utilizing sound editing tools selected from the group of Macromedia SoundEdit Pro™ and DigiDesign Pro Tools™; and/or utilizing video editing tools selected from the group of Avid Media Suite™, Asymetrix Digital Video Producer™, Adobe Premiere™; and/or distributing the extension to the computer with web browsers selected from the group of Netscape Navigator™ and Microsoft Internet Explorer™.

By way of example, the creativity tools of the invention can include one or more of the following: Microsoft Word™, Microsoft Excel™, Microsoft Powerpoint™, and Novell WordPerfect™.

In another aspect, the container is stored in a remote database, and the methods of the invention include the step of accessing at least part of the container through on-line communication with the database. For example, the step of accessing part of the container through on-line communication can include one or more of the following: communication through the Internet, communication through a computer network, and communication through the Intranet; and/or utilizing a file data stream wherein rendering of the work is possible only after all data representative of the work is present at the computer; and/or utilizing a continuous data stream wherein rendering of the work is possible, in part, with concurrent arrival, at the computer, of data representative of the work.

In one aspect, the container is stored on a CD-ROM, and the method includes the step of accessing that part of the container through communication with a CD-ROM drive. Alternatively, for example, the container is stored on a magnetic data disk, and the invention includes the step of accessing part of the container through communication with a disk drive. In still another example, the container is stored within internal memory of the computer, and the method includes the step of accessing part of the container within internal memory.

In still another aspect, the system extension includes means for recognizing registration data within the metadata, the registration data identifying an associated registration server capable of administrating the data, and the method includes the step of contacting the registration server to negotiate, on-line, a license to the work. An additional step can include contacting the registration server to negotiate for auxiliary permissions data, the auxiliary permissions data specifying auxiliary uses of the media that is licensed beyond the authorized use specified in the minimum permissions data.

In another aspect, the extension can include: means for recognizing the auxiliary permissions data and for enabling the user to use the work in accord with the auxiliary uses; and/or means for recognizing registration data within the container, the registration data identifying an associated registration server capable of administrating the data, and can further include the step of contacting the registration server to authenticate the work; and/or means for prohibiting unauthorized uses of the work when the unauthorized uses exceed the operations specified in the minimum permissions data. Such unauthorized uses of the media can include, for example, drag-and-drop operations on the computer, copying, saving and/or printing the work.

Typically, the auxiliary permissions specify a set of operations that can be performed on the work after executing a digital contract to the work. The auxiliary permissions are usually obtained through one of email or web access.

The invention also provides improvements to an operating system of the type which facilitates control and communication of a digital data processor. A plug-in extension is used to manipulate copyrighted electronic media, the extension having means for opening a data container having a digital creative work and minimum permissions data attached thereto. The minimum permissions data specifies one or more operations that can be performed on the work without a license to the work. The extension recognizes the minimum permissions data and enables a user of the processor to use the work in accord with the specified operations.

The container can also have metadata attached thereto. The metadata typically has one or more of ownership identification information, ownership contact information, rights administration information, rights administration contact information, creatorship information, authorship information, creator contact information, author contact information, listings of antecedent object information, listings of related object information, licensing terms, licensing conditions, publisher information, and ownership credits, and wherein the extension comprises means for reviewing the metadata selectively.

In another aspect, the invention provides a plug-in operating system extension, including: means for operating in conjunction with an operating system controlling a digital data processor; means for recognizing a data container having digital creative works and minimum permissions data attached thereto, minimum permissions data specifying one or more operations that can be performed on the work without a license to the work; and means for opening the container and enabling a user of the processor to use the work in accord with the specified operations.

In this aspect, the container can have registration information attached thereto, the registration information specifying a registration server capable of administering the container, and can further include means for recognizing the registration information and for communicating with the registration server to acquire properties associated with the container.

The container can have registration information attached thereto, the registration information specifying a registration server capable of administering the document, and can include means for negotiating a digital contract with the registration server, the contract specifying licensing terms and auxiliary uses to the work.

In still another aspect, a server is provided for managing digital copyrighted works, including: (A) means for communicating with at least one on-line data processor connected for communication with the server, the on-line data processor having (i) means for recognizing a secure digital document having copyrighted electronic media and minimum permissions data attached thereto, the minimum permissions data specifying minimum authorized use of the media without a license to the media; and (ii) means for opening the document and enabling a user of the processor to use the media in accord with the authorized use; (B) means for registering the document according to user-selected options at the data processor; and (C) means for negotiating with the data processor to obtain auxiliary permissions to the document and for sending the auxiliary permissions data to the data processor thereby expanding the authorized use of the data processor.

The invention thus provides several advantages. By way of example, it provides for identification of digital creative works so that potential licensees know, or can learn of, the owner, author, creator, and publisher of the underlying digital work. In accord with the invention, the use of the container, based in object technology, with METADATA and the Digital Creative Work attached thereto facilitates the appropriate identification of the Work. The METADATA provides the vehicle for identification information and minimum permissions to the Work, and further provides detail for subsequent licensing of the Work. Further, the invention permits substantially seamless interaction between users and the Digital Creative Work. By way of example, OBJECTs appear like any other visual instantiation on a web page. It is only after the user tries to operate on the OBJECT beyond the user's current consumption, e.g., viewing the OBJECT on the computer screen, when it becomes apparent that there is additional control associated with the OBJECT.

The invention also provides for the secure electronic copyright management and automatic identification of ownership of creative works distributed as digital or electronic media, particularly over computer networks. Briefly, one aspect of the invention provides a system which packages electronic media into a secure document format (the "CONTAINER"), including a data container for the media and a minimum permissions data set to specify the minimum authorizations needed to view or otherwise access the media. The CONTAINER can also include a container header, a container identifier, a source works extensions module which maintains a bibliographical history of the media, and a digital signature to authenticate the media. The CONTAINER and the associated network-based tools, described below and constructed according to the invention, enable the attachment of minimum permissions to copyrighted works and the subsequent on-line licensing of the media.

More particularly, and in another aspect of the invention, the CONTAINER containing the media is registered on a registration server and licensed through an authorization server (together the "REGISTRY"). Potential licensees view the CONTAINER through the authorizations within the minimum permissions data set, and communicate with the authorization server, if desired, to obtain a license to the media. Once licensed, the licensee can utilize the media in accord with an auxiliary permissions data set that is assigned to the CONTAINER during the on-line licensing transaction.

Subsequent viewers and/or users of the CONTAINER also communicate with the authorization server. Thus, in another aspect, the invention provides for the licensing of the media to creators of derivative works, i.e., those who modify an original work of authorship and who obtain authorization to do so through an augmentation in the permissions data set. As above, the modified CONTAINER is then registered on a registration server and licensed through an authorization server. The CONTAINER in this aspect preferably includes a sourceworks extension module which records the original and derivative authorship of the media. By retaining such information, a copyright "family tree" or electronic bibliographic record is maintained for the media. Preferably, the authorship information in the sourceworks extensions is resident as a data element within the CONTAINER. However, the sourceworks extensions can also be maintained on or through the authorization servers, depending upon the number of servers used in the registration of derivative uses of the media.

Like the sourceworks extensions, the invention can also record any and all users who access the media. In accord with this aspect, the CONTAINER includes a usage module which records selected information about each user who accesses the media. The selected information can include, for example, a unique address of the user, individual or company accessing or utilizing the media, or the actual identity of the user. Preferably, the user information stored in the usage module is recorded and stored only after auxiliary permissions are augmented to the minimum permissions data set; and typically, the user's identity or location is recorded in the course of the licensing transactions with the authorization server. Like the sourceworks extensions, the usage module can also be resident with the CONTAINER, as another data element, and/or with the authorization server. In the latter case, each time a user communicates with an authorization server to license a particular media, the user's identity or location are recorded and stored therein.

Accordingly, the invention provides several advantages in the automation and tracing of copyright clearances for both the initial users and derivative developers of electronic media. Unlike the methods in the prior art—i.e., the method of relying on copyright laws and treaties to protect copyrighted works, and the method of encrypting the media through electronic keys—the CONTAINER format and system architecture of the invention provide for (1) both fair use and ownership protection; and for (2) automatic management of media rights, including the controlled access to media in derivative works. Specifically, the system of the invention attaches certain minimum permissions to a widely-distributed version of the media packaged as a CONTAINER, thus being generally usable for free personal use. The CONTAINER creator or author determines these minimum permissions in the spirit of fair use, and the permissions data set are subsequently updated to an auxiliary permissions data set through on-line licensing should the user be interested in more advanced licensing or uses of the media.

In other aspects, the invention provides an encrypted electronic signature and optional data encryption, to enhance or guarantee the authenticity of the entire work, including authorship. More particularly, in other aspects, the CONTAINER encapsulates the required data in a secure fashion using encryption; and the digital signatures are based on message digests resulting from one-way hash functions.

In still other aspects, the system of the invention utilizes client/server system architecture based upon the TCP/IP network protocol standard. Those skilled in the art will appreciate that other network protocol standards can be used without departing from the scope of the invention.

In accord with further aspects of the invention, users can unpackage or unwrap CONTAINERs through a controlled environment, specifically from within a compatible application or program extension, i.e., a Plug-in, which can provide the requisite controls over document use.

The invention also provides a set of easy-to-use network-based tools for registering and administering copyrights of electronic creative works. In one aspect, for example, a viewing module is provided to view and edit media-packaged graphic, image, video, audio, and textual objects. This viewing module, referred to herein as a "VIEWER," is generally required, along with the SYSTEM EXTENSION, to view and edit Digital Creative Works within CONTAINERs.

In still another aspect, a packaging module is provided to encapsulate a newly created work in a secure, digitally-formatted package—i.e., a CONTAINER. The packaging module, referred to herein as a "PACKAGER," is particularly useful to authors, creators and publishers who seek to secure their copyrighted works and who seek to encapsulate other information with the works, such as authorship, ownership, minimum permissions, and source works extensions. Accordingly, a user of the PACKAGER can selectively package such information with the media to formulate a CONTAINER.

In other aspects, a registration server provides registration and authorization services on a platform such as Windows NT or Unix. The registration server is used by information creators who want users of their works to easily identify ownership and potential licensing terms, and to transact and license those works on-line. The Authorization server, on the other hand, is used by information creators and users to obtain access to Digital Creative Works and to license those works for their own use. Typically, in accord with another aspect, the registration server for each CONTAINER operates as the authorization server for all subsequent licensing transactions to that CONTAINER. In this latter aspect, the combination registration server and authorization server is a REGISTRY.

The invention provides certain other advantages over the prior art in that creators and publishers of electronic media have direct control of the copyrights they hold through the use of authorization and registration servers. Further, the invention is preferably compatible with widely accepted object technology standards, e.g., OLE and OpenDoc, to ensure compliance with the widest possible range of applications and on several platforms.

The invention also provides for automated and controlled network-based copyright management. The registration server can be scaled to fit the needs of any authorization and registration service, from single-author shops to massive centralized clearinghouses.

In still another aspect, the VIEWER provides a mechanism for users to gain access to the data within copyrighted CONTAINERs. Specifically, the VIEWER and SYSTEM EXTENSION ensure that operations performed on media-packaged data objects are in compliance with the permissions that have been granted to the user.

In other aspects, a user can transact a license to the CONTAINER through on-line communications with the REGISTRY. More particularly, the SYSTEM EXTENSION in this aspect (i) generates a licensing request signal in response to inputs by the user, and (ii) communicates that signal to the authorization server assigned to that CONTAINER. This request, sometimes denoted herein as a "License Request," provides an entry point for on-line licensing of media-packaged works. In this way, a successfully licensed user can obtain auxiliary permissions to the CONTAINER of interest, thereby extending the set of operations which the user may perform for a given work.

In still other aspects, the SYSTEM EXTENSION operates to display selected registry information about the CON- TAINER. This display, sometimes denoted herein as the "Registry Information Display," provides information such as authorship, ownership, and the licensing terms associated with the electronic media, thereby facilitating the user's review and evaluation of the CONTAINER prior to licensing. The registry information is preferably stored in the CONTAINER itself, and/or at the CONTAINER's registration server.

A record of the media source works is also available through the SYSTEM EXTENSION, in accord with another aspect of the invention. As discussed above, the sourceworks extensions provide a bibliography of the authors of the media so that the appropriate authors are credited with their works even after the works are edited by a derivative author. The sourceworks extensions are typically available within a display—sometimes denoted herein as the "Source Works Display"—at the user's computer terminal.

In accord with other aspects of the invention, the SYSTEM EXTENSION provides standardized tools and procedures for obtaining a certified digital identification of a CONTAINER, and for becoming a licensed user to that CONTAINER.

In another aspect of the invention, a PACKAGER encapsulates authorship, ownership, minimum use permissions, source works information and the associated creative works in a secure package. The PACKAGER has several aspects, including:

Through the PACKAGER, a user can display the status of permissions for each source work, obtain authorship, ownership, and licensing information from the source work's registration server, and selectively obtain auxiliary permissions as required for each source work.

The PACKAGER allows the author to check clearances for all sources of a work in progress and to engage in EXTENSION-like licensing transactions to obtain or upgrade auxiliary permissions.

The PACKAGER allows the author to verify and modify the information that is encapsulated with the packaged media in a CONTAINER.

Registration is the final step in setting up a CONTAINER in accord with the invention; and the PACKAGER provides a registration client and procedure for registering a new creative work.

Like the SYSTEM EXTENSION, the PACKAGER provides standardized tools and procedures for obtaining a certified digital identification and for becoming an authorized user.

In another aspect of the invention, a Software Development Kit (SDK) is provided to enable developers of multimedia applications, games, or multimedia authoring tools (including applications for content creation) to incorporate VIEWER, SYSTEM EXTENSION and PACKAGER functionality into their applications.

The invention thus facilitates the management of copyrighted works and ensures that the media packaged within a CONTAINER is authentic. The invention further enables the packaging of useful and selective information with the creative work, such as container identification, ownership, permissions, and sourceworks extensions. These features are provided, at least in part, by the VIEWER, SYSTEM EXTENSION, PACKAGER and the REGISTRY. Through the registration server, for example, information providers of any size can take advantage of rights management for their creative works, and users on a network connected to the server enjoy easy and secure on-line licensing of the works managed therein.

In accord with a preferred aspect of the invention, the VIEWER, SYSTEM EXTENSION and PACKAGER do not impose perceivable overhead during the course of normal rendering or editing of the work. The execution of VIEWER, SYSTEM EXTENSION and PACKAGER functionality is quick to ensure that network functions have good performance within the available network bandwidth.

In still other aspects of the invention, VIEWER, PACKAGER, Registration Server Modules and Authorization Server Modules are operable on Win95, Windows NT, MacOS and Unix-based platforms.

In other aspects, the VIEWER, SYSTEM EXTENSION and PACKAGER of the invention operate in conjunction with OLE and OpenDoc.

The invention also provides a system for authorizing access to copyrighted electronic media. An authorization server is connected for data transfer between an internal memory and at least one external data processor, and an internal storage stores selected information about the electronic media, e.g., the licensing terms for gaining auxiliary permissions to the media, the copyright ownership of the media, and revenue estimates about the media. A relay section that is responsive to a request signal by the data processor communicates the selected information to the data processor. A data comparison section receives response signals from the data processor and compares the selected information with the response signals. In this way, the data comparison section generates an acceptance signal when the response signals correspond to at least a part of the selected information, and communicates the acceptance signal to the data processor to authorize access to the media.

The system can also store the media within a storage memory, in another aspect. This memory can be within a computer connected for electronic data transfer with the data processor, whereby the computer is responsive to the acceptance signal to transfer either (1) authorizations to access the media or (2) the media to the data processor.

The system preferably includes a process section for tagging an encrypted digital signature to the media, thus authenticating the media. Another section—including a source works extension module—can also be included to append a bibliographic record to the media, the bibliographic record forming a digital representation that specifies information that references each source work and access restrictions associated with the source work.

The system can further include a section for appending auxiliary permissions to the media, the auxiliary permissions forming a digital representation that specifies an authorized use of the media, such as viewing, copying or editing the media.

In yet another aspect, the system includes an access control section for withholding access authorization to a portion of the media, the access control section thus being responsive to the acceptance signal to remove access restrictions to the portion. In this way, permissions and access to copyrighted media can be provided to specified parts of a complex multimedia object, e.g., one which includes written text, graphics and sounds.

The invention further provides a system which controls selective access to electronic media. The system includes one or more servers that communicate via a data transfer link between an associated system memory containing the media and at least one external data processor. A communication section communicates content-specific permission information about the media to the data processor, the permission information specifying data processor actions which are restricted and which require augmented access privileges to perform. A storage section enables the storage of selected other information about the media; while a relay section, responsive to a request signal by the data processor, communicates the other information to the data processor. A data comparison section receives response signals from the data processor and compares the other information with the response signals, the data comparison section generating an acceptance signal when the response signals correspond to at least a part of the other information. An access section restricts data transfers between the data processor and a portion of the media, the access section being responsive to the acceptance signal to remove data transfer restrictions between the data processor and the portion within the system memory.

The communication section of this aspect can include one of (i) a stand-alone software module, (ii) a plug-in software module corresponding to an application environment that generated or modified the media, (iii) a program extension corresponding to an application environment which generated or modified the media, (iii) a software module integrated into an application environment by way of a source code library or linkable object code performing substantially similar functions.

Although other communication protocols are suitable for the invention, communication standards based upon the TCP/IP network protocol are preferred.

The invention also provides methods for authorizing data transfers of copyrighted digital media, including: affixing content-specific permission information to the media, the permission information specifying actions which are restricted and which require augmented access privileges to perform; storing selected information about the electronic media on an authorization server connected for data transfer with at least one computer; electronically communicating selected information about the media to the computer; receiving response signals from the computer and comparing the selected information with the response signals; and generating an acceptance signal when the response signals correspond to at least a part of the selected information, thereby authorizing access to the media.

The invention also provides for optional encryption of the data within the secure container. Accordingly, the methods of the invention include, for example, the step of encrypting the media through an RSA public key algorithm.

The method of this aspect can also include the step of communicating a digital representation of at least one of (i) a copyright ownership of the media, (ii) a set of licensing terms for the media for different user classifications, and (iii) revenue estimates about the media.

In another aspect of the invention, a method is provided for maintaining an electronic bibliographic record of digital media, including: opening an object container containing the digital media, the object container including a representation of the media, a data identifier of media, and data specifying minimum permissions required to access the media; editing the digital media in an application environment; and attaching the data identifier and minimum permissions data to the edited media into a source works list. The source works list provides, among other information, a bibliographic record of the authorship represented in the media.

Such a method can also include the steps of decrypting the media, and encrypting the media after attaching the data identifier and permissions data into the source works list.

A method of the invention also includes a process for determining the authenticity of digital media, including the step of affixing an encrypted digital signature to the media. In this aspect, the CONTAINER is authenticated by encoding a signature representing the registration of the media. By way of example, a private key is resident with the registration server which is under strict control of the system. The authenticity—in this example—is thus granted by the registration server and proven by the digital signature in the CONTAINER. Alternatively, in another example, the private key is provided to the user of a particular application, again under the tight control of the system.

In yet another aspect, a computer network is provided for managing original works of authorship, including: a process actuation section for affixing copyright information to a binary data element corresponding to an authored media; a process actuation section for affixing minimum permission information to the data element, the permission information specifying access restrictions to the data element; a server for storing information concerning the rights to the media, the server including a control module for controlling access to the data element according to the minimum permission information by restricting data transfers between the server and one or more computers networked with the server; a process section for tagging the data element with supplemental information; and a process section for maintaining copyright information through derivative uses of data element throughout the network.

The invention also provides a PACKAGER, which is a system for packaging electronic media within a secure electronic container. The PACKAGER includes a first process section for attaching a data identifier to the media; and a second process section for attaching minimum permissions data to the encrypted media, the minimum permissions data specifying minimum acceptance terms required to electronically access the media.

In other aspects, the PACKAGER includes a process actuation section for attaching a digital signature to the media, the digital signature providing an authentication to the media; and a process actuation section for affixing source works extensions to the media, the source works extensions specifying a bibliographic record of the media. This bibliographic record is a digital representation that specifies bibliographic information about the authors and minimum permissions of the media, thereby providing persistence through generations of derivative use of the media.

A SYSTEM EXTENSION and VIEWER subsystem is also provided for unpackaging electronic media configured within a secure electronic container. A first process actuation section recognizing permissions data attached to the media, the permissions data specifying one or more authorizations needed to electronically access the media; and a second process actuation section opens the media when a user has the authorizations corresponding to the permissions data.

In other aspects, the subsystem includes a communication section that engages an authorization server when the user does not have the requisite minimum authorizations of the permissions data set; or when a user desires to augment the permissions to a particular media by transacting a license to that media. The communication section thus includes a process section for transmitting transactional information to the server, and for receiving, from the server, auxiliary permission to utilize the media.

The methods of the invention can include the steps of encrypting the media, and/or transferring the container to the data processor via one of point-to-point email, CD-ROM, ftp, gopher, smtp (email), and http (World Wide Web). In one aspect of the invention, for example, the registration server first authorizes a user with a PACKAGER through log-in process to establish a secure line, such as known in the art. The user and PACKAGER then generate the registration information relating to the particular CONTAINER, and transmit the information and a message digest to the registration server. Upon receipt, the registration server returns a "registration certificate," in digital form, that is signed by the server's private key. The registration server's public key is widely known, so that the registration server can operate as a certification authority for the packaged-media. The registration certificate is then passed through secure channels, and the PACKAGER attaches the digital signature to the CONTAINER. Accordingly, authenticity is demonstrated to anyone with a VIEWER or PACKAGER that has access to the CONTAINER.

In an alternative aspect, if the communication channel is unsecured, the registration certificate is encrypted via public key to the user's public key.

These and other aspects and advantages of the invention are evident in the description which follows and in the accompanying drawings.

BRIEF DESCRIPTION OF THE DRAWINGS

FIG. 8 illustrates one acceptable process flow for providing copyright management according to the invention;

DETAILED DESCRIPTION OF THE INVENTION

Figure 1:
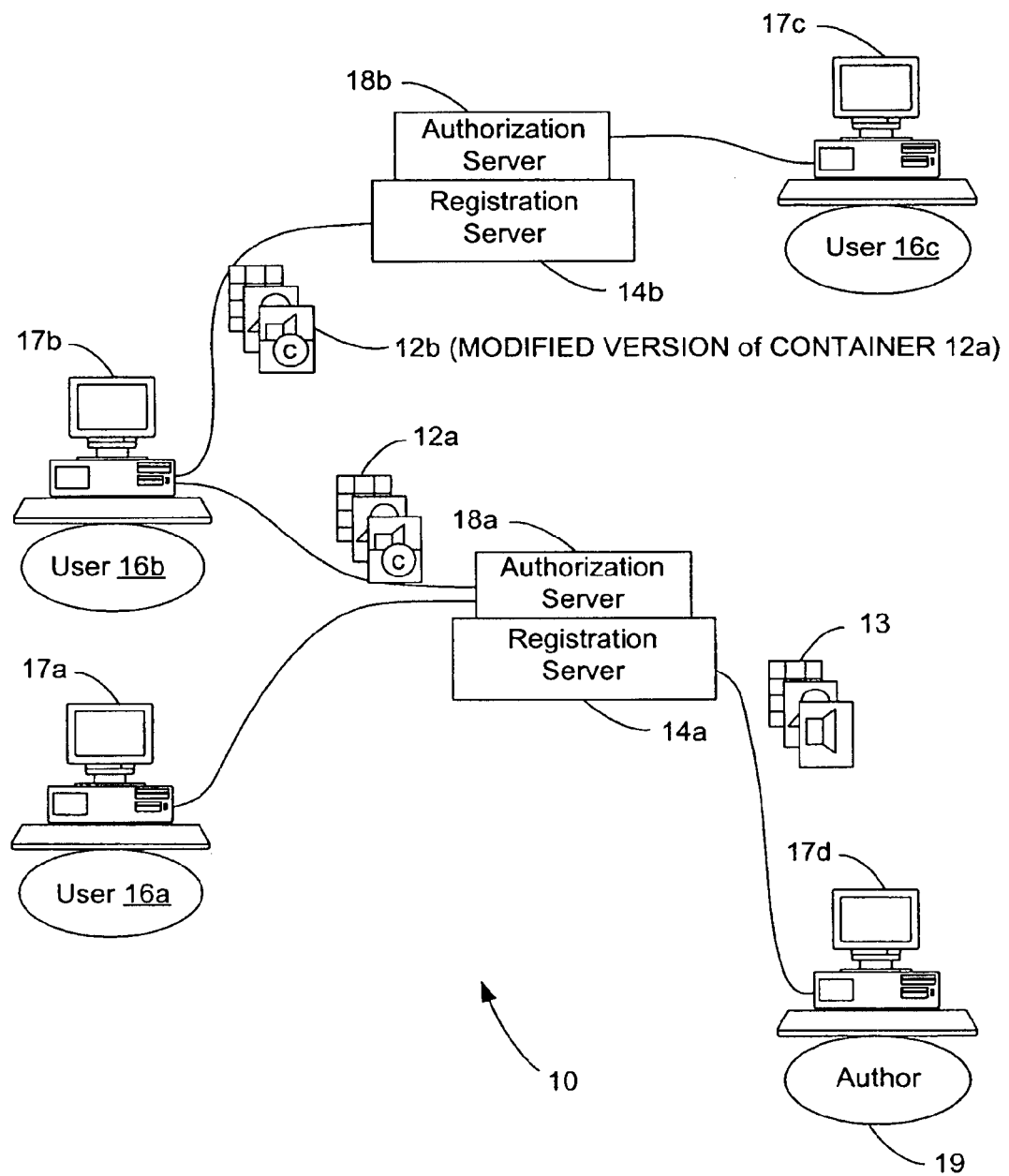
FIG. 1 illustrates one system, constructed according to the invention, for managing copyrighted works formed as CONTAINERs.

FIG. 1 illustrates a system 10, constructed according to the invention, whereby CONTAINER 12a, 12b are created and packaged, and then registered on associated registration servers 14a, 14b, respectively. Users 16a, 16b and 16c are connected for data transfers with one or more of the authorization servers 18a, 18b, such as through a computer network or the Internet.

The illustrated CONTAINERs 12a, and 12b are created as copyrighted media by author 19 and user 16a, a derivative author of the work 12a. For example, media 13 is representative of original work of authorship. Thereafter, the CONTAINERs 12a, 12b are packaged as a data container, according to the systems and methods described herein, and as denoted by the copyrighted © symbol marked over the media. These packaged CONTAINERs 12a, 12b are registered on servers 14a, 14b, respectively, and are made available for license through authorization servers 18a, 18b. A single server can operate as both the registration server and authorization server.

In operation, the CONTAINERs 12a, 12b are available for limited free use according to the minimum permissions data set assigned to each CONTAINER. Typically, the minimum permissions allow users with access to the CONTAINER to view the CONTAINER, but not to save or otherwise transfer the CONTAINER without first obtaining auxiliary permission from the CONTAINER's authorization server. As illustrated, for example, users 16a, 16b each have access to CONTAINER 12a and may therefore freely read or view the contents of the media within CONTAINER 12a at their associated personal computers 17a, 17b, respectively. If, however, the users 16a, 16b attempt to act on the CONTAINER 12a in a manner which is not in accordance with the permissions they hold, they are automatically prompted to obtain a license to the CONTAINER 12a. The licensing transaction occurs through the authorization server 18a, which connects and communicates with the users 16a, 16b through personal computers 17a, 17b. Alternatively, the users 16a, 16b may, if desired, initiate a licensing transaction with the server 18a if they know, for example, that their permissions are insufficient to access the CONTAINER 12a in the desired way.

Once licensed to the CONTAINER 12a, the licensed user has augmented auxiliary permissions to utilize the CONTAINER in some other way, such as saving and/or modifying the CONTAINER. Similarly, user 16c is connected via computer 17c to the authorization server 18b, and may therefore view and, if desired, license CONTAINER 12b through server 18b. The format of CONTAINERs 12a, 12b are described in more detail in connection with FIG. 1A.

Figure 1A:
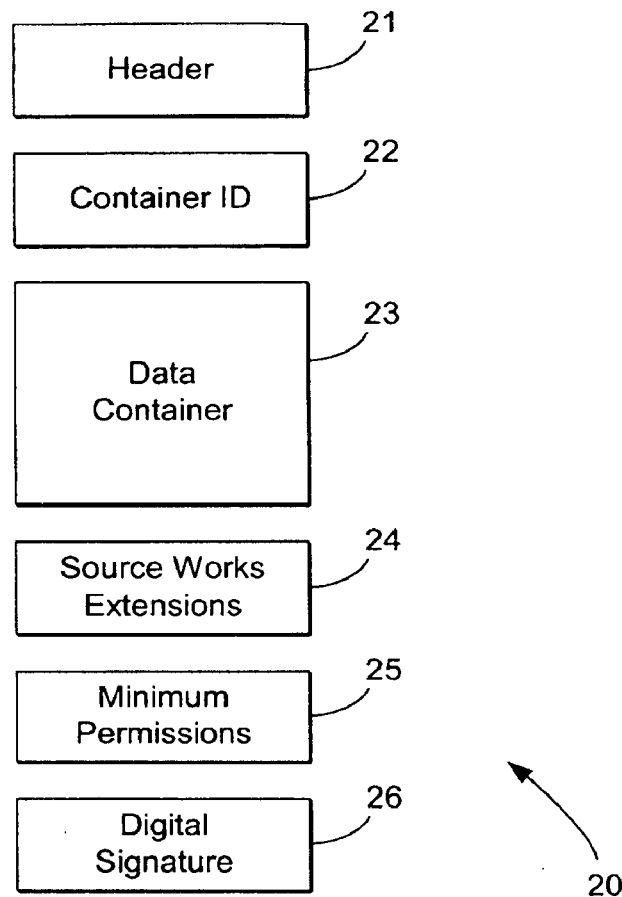
FIG. 1A illustrates a schematic view of one CONTAINER constructed according to the invention.

CONTAINER 20 of FIG. 1A provides a secure container for electronic media, including heterogeneous multimedia data types such as musical scores coupled with graphical images. More particularly, the CONTAINER 20 provides a package that encapsulates binary data objects, shown as the data container 23, and can contain some or all of the illustrated data components 21, 22, 24, 25 and 26.

In FIG. 1A, the Container Header 21 contains basic information about the CONTAINER 20, including, without limitation, information such as a unique file format identifier, a format revision code, a document creator application type, a file type (typically the MIME type code) of the enclosed data, a comment field length, and a comment field, typically up to about 256 characters. The information within Container Header 21 is generally not encrypted.

The Container Identifier 22 uniquely identifies the CONTAINER 20 by the registration server upon which the CONTAINER has been registered, and the CONTAINER's registration or index number on that server. This registration code typically contains the server name and registration index. A registration server cross-reference table, working in conjunction with the Internet's Domain Name Service (DNS), is used to find the actual network address (typically a TCP/IP address) of the registration server. In one example, a unique server code may indicate local registration, usually indicating a work in progress. In another example, an author logged onto a computer, such as the author 20 of FIG. 1, and actively generating a copyright work in progress, e.g., a novel in Microsoft Word™, will update and store the work on the local computer. In one embodiment of the invention, a work in progress is a locally accessible file which has not been authenticated through the registration process.

The Data Container 23 contains the information representing the electronic media or Digital Creative Work, typically in an original file format. If desired by the author, this data can be secured through encryption, such as through secret or public key methods known in the art. The data within the Container 23 is usually passed in the clear, i.e., unencrypted. However, increased control can be obtained through encryption of the associated media. The fields within the Data Container 23 can include the enclosed data file, and can include the data container extension code, and the data container size, among other information.

The Source Works Extensions 24 provides a bibliographic record, or 'persistence,' of copyright uses through generations of derivative work. The data fields within the Sources Works Extensions 24 can include any of the Source Works Extension Code, the Container ID, and the Permissions mask. If demanded by the licensor of the work, or desired by the licensee, the Container ID and the applicable permissions mask (the set of relevant use permissions) for the source work are included in the derivative work. In accord with the preferred use of the invention, the Source Works Extensions 24 are encrypted; and any number of Source Works Extensions 24 may be included in a CONTAINER 20. For example, information about successive derivative authors of the CONTAINER 20 are stored sequentially as a Source Works Extension 24. By way of another example, one Source Work Extension 24 can include the release information for any performer whose image or audio likeness appears in the current CONTAINER.

The Source Works Extensions preferably operates to protect the source works author, even at the risk of burdening the derivative author and/or developer. Authors can require that their work is included as a source works extension in a derivative work, or they can leave this choice to the editor or derivative developer. Authors can also request that their source works are not displayed. For example, they may require the derivative developer to go through the authorization process again to obtain permissions and to include information regarding the work.

The Minimum Permissions 25 includes a permissions data set that are distributed with all authentic copies of the CONTAINER 20. These permissions affect the minimum use of the data within the Data Container 23 in cases where an on-line licensing transaction has not yet taken place. The Minimum Permissions 25 thus uphold the spirit of the fair use doctrine of copyrighted works; and the careful setting of the minimum permissions data set by the author(s) or creator(s) of the media ensures easy access and limited free use of the media up to the minimum authorized permissions set forth in the Minimum Permissions 20. This free use through minimum permissions is made possible by viewing the CONTAINER 20 through a SYSTEM EXTENSION, constructed according to the invention and described in more detail below, which is widely distributed to potential users of the CONTAINER 20.

Minimum permissions 25 are superseded by auxiliary permissions which are assigned to the CONTAINER 20 during an on-line licensing transaction. Auxiliary permissions are preferably contained in secure License Certificate documents provided by the Registration Server and encrypted to the licensee's key.

In accord with the preferred embodiment of the invention, an encrypted Digital Signature 26 is also part of the CONTAINER 20, to facilitate authentication. While the Signature 26 can be encrypted to ensure the authenticity and integrity of the CONTAINER 20, encryption of the bulk data 23 is also possible to guarantee a higher level of security.

Those skilled in the art will appreciate that other orderings of the information within the CONTAINER 20 are possible, including one where the Data Container 23 is last.

In accord with the preferred embodiment of the invention, users can unpackage or unwrap the CONTAINER 20 only through the controlled management of the copyrights associated with the CONTAINER 20. Specifically, the CONTAINER 20 is viewable through the SYSTEM EXTENSION and, if needed, a VIEWER. The VIEWER is available in several formats to accommodate the differing types of media contained within the CONTAINER. By way of example, once the CONTAINER 20 is recognized by the SYSTEM EXTENSION, documents formatted within the Data Container 23 of FIG. 1A can be opened and manipulated on compatible applications such as:

Stand-alone VIEWER applications, with SYSTEM EXTENSION functionality provided therein, which allow viewing of the media and of the networked licensing and registration information.

Applications which are fully OLE compliant and where the OLE2 implementations of the SYSTEM EXTENSION, VIEWER and PACKAGER reside on the system.

Applications for which VIEWER and/or SYSTEM EXTENSION plug-ins may be available, so that user's of applications such as Adobe's Photoshop®, Premiere®, and Acrobat® can directly interface with CONTAINERs.

Applications with integrated kernel software encompassing VIEWER and EXTENSION-like functionality, such as for integration into World Wide Web software like Mosaic® and Netscape®.

The CONTAINER 20 of FIG. 1A can also include information about the successive users of the CONTAINER. For example, the Source Works Extensions 24 can have an appended data field or usage module which stores selected information about the users of the CONTAINER. Such usage information can include, for example, the identity and/or location of the user. Alternatively, the usage information can be stored at the associated authorization server during or in connection with a licensing transaction to the CONTAINER.

In summary, the CONTAINER format of FIG. 1A augments the multimedia data content with supplementary information which identifies, without limitation, some or all of the following information: the source, registry, and format of the data; the copyright legacy of the data; minimum permissions to use of the data prior to on-line licensing; a digital signature to prove authenticity of the data; and a use record of the users who accessed the media.

Figure 2:
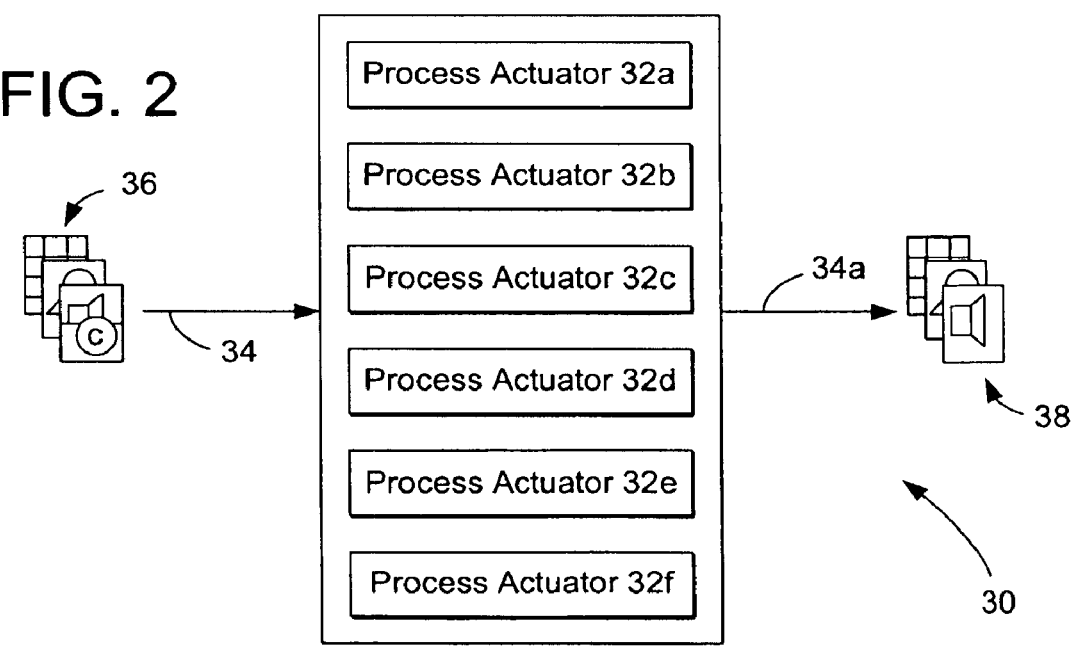
FIG. 2 shows a schematic illustration of a VIEWER and SYSTEM EXTENSION subsystem, constructed according to the invention, and which is suitable for viewing selected information within a CONTAINER such as illustrated in FIG. 1A.

FIG. 2 illustrates a VIEWER and SYSTEM EXTENSION combination system 30 constructed according to the invention and which is suitable for viewing the CONTAINER 20 illustrated in FIG. 1A. The system 30 includes a series of process actuators 32a . . . 32f, each of which decodes and/or interprets the several elements of the CONTAINER 20. The system 30 is connected for data transfer along data transfer line 34 to communicate and operate on the CONTAINER 36, stored for example on a server. The several process actuators 32 thereafter operate, in combination, to enable viewing of the media within the CONTAINER 36 and in accord with the minimum permissions data set. This media is illustrated in FIG. 2 as the data objects 38, which are, for example, displayed in a computer screen, through data transfer line 34a, so that a user can view the contents of the media data objects.

The system 30 can be constructed as a printed circuit board, application specific integrated circuit, a VLSI circuit, or as a software module resident within a computer and operable in connection with an internal microprocessor to perform the various process actuator functions described below in connection with process actuators 32a . . . 32f. Typically, the system 30 is connected for communication with a computer display so that once the CONTAINER 36 is unpackaged, the data objects 38 within the CONTAINER 36 are viewable to the user.

More particularly, the process actuator 32a interprets selected information about the container header, e.g., the header 21 shown in FIG. 1A. This information can, for example, include the type of file within the CONTAINER 36, or a comment field specifying certain details about the media as described by the media's author. Process actuator 32b, likewise, interprets selected information about the container identifier, e.g., the identifier 22 of FIG. 1A. Such identifier information includes, at least, a unique identifier of the registration server upon which the CONTAINER 36 is registered, so that appropriate on-line licensing transactions can occur with the appropriate location. Process actuator 32c interprets—and sometimes decrypts—the data formulating the media 38, so that the user can view the media 38 to evaluate whether to engage in a licensing transaction. The process actuator 32c provides minimum access to the media 38 in accord with the minimum permissions data set which is associated with the CONTAINER 36 and which is loaded and interpreted by the actuator 32d. Process actuator 32e interprets selected information about the source works extensions associated with the CONTAINER 36, while process actuator 32f interprets information about the digital signature associated with the CONTAINER 36, thereby providing a means to authenticate the media 38.

Not all process actuators 32 are required in every system 30, depending upon the form of the CONTAINER 36. At a minimum, however, the system 30 must be able to interpret the data within the CONTAINER, including, if necessary, decrypt algorithms needed to unlock any encrypted data within the CONTAINER 36; and the system 30 must identify the CONTAINER's minimum permissions as well as the connectivity information of the CONTAINER's associated authorization or registration server. The system 30 will not, however, typically permit further actions—such as copying and/or downloading of the media 38 to disk—without first obtaining auxiliary licensing permissions from the associated authorization server, as described in more detail below. The system 30 thus provides a minimum access to the data 38, such as viewing the media contents on the user's display terminal, thereby promoting limited but fair use of the data 38.

Figure 3:
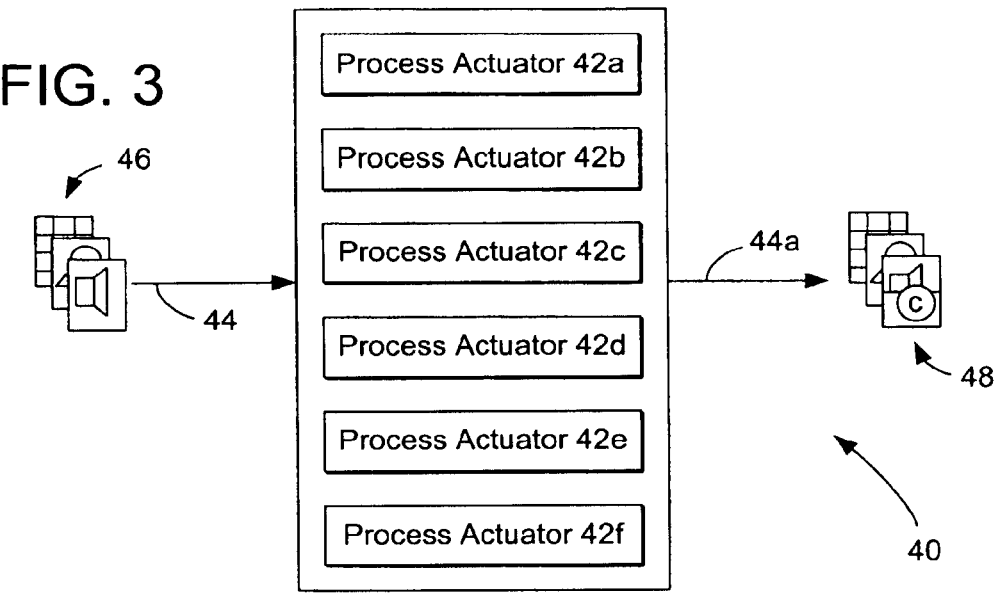
FIG. 3 shows a schematic illustration of a PACKAGER system, constructed according to the invention, and which is suitable for encapsulating electronic media within a CONTAINER such as illustrated in FIG. 1A.

Similarly, electronic media is packaged into a format such as the CONTAINER 20 through a packager system constructed according to the invention and denoted herein as a PACKAGER, such as illustrated in FIG. 3. The PACKAGER system 40 of FIG. 3 is suitable for generating the CONTAINER 20 illustrated in FIG. 1A. The PACKAGER 40 includes a series of process actuators 42a . . . 42f, each of which operates to formulate one or more of the elements of the CONTAINER 20, FIG. 1A. The PACKAGER 40 is connected for data transfer along data transfer line 44 to communicate and operate on electronic media 46. The several process actuators 42 thereafter operate in combination to package or encapsulate the media 46 into a secure CONTAINER 48. For example, a user of the PACKAGER 40 is generally an author of copyrighted works, and one process actuator is used to specify the minimum authorized use of the media within the minimum permissions data set. The resulting packaged media, illustrated in FIG. 3 as the CONTAINER 48, is thereafter registered on a registration server, through data transfer line 44a, so that the CONTAINER 48 is available for on-line licensing transactions by any connected user having a SYSTEM EXTENSION and connected to the authorization server.

By way of example, the PACKAGER 40 can be constructed as a printed circuit board, an application specific integrated circuit, a VLSI circuit, or as software module resident within a computer and operable in connection with an internal microprocessor to perform the various process actuator functions described above in connection with process actuators 42a . . . 42f. . Typically, the PACKAGER 40 is connected for communication with a registration server so that once the CONTAINER 48 is packaged, the data objects 46 within the CONTAINER 48 are available for license by any connected user.

Sufficient information is packaged within the document format to enable a potential licensee using the SYSTEM EXTENSION to engage in on-line licensing transactions to obtain, for example, copyright ownership, licensing, and revenue information about the data. If the terms are acceptable, the potential licensee uses the SYSTEM EXTENSION to obtain additional permissions for derivative development or other use not covered in the minimum permissions data set. This operation is described below in connection with FIGS. 4–6.

Figure 4:
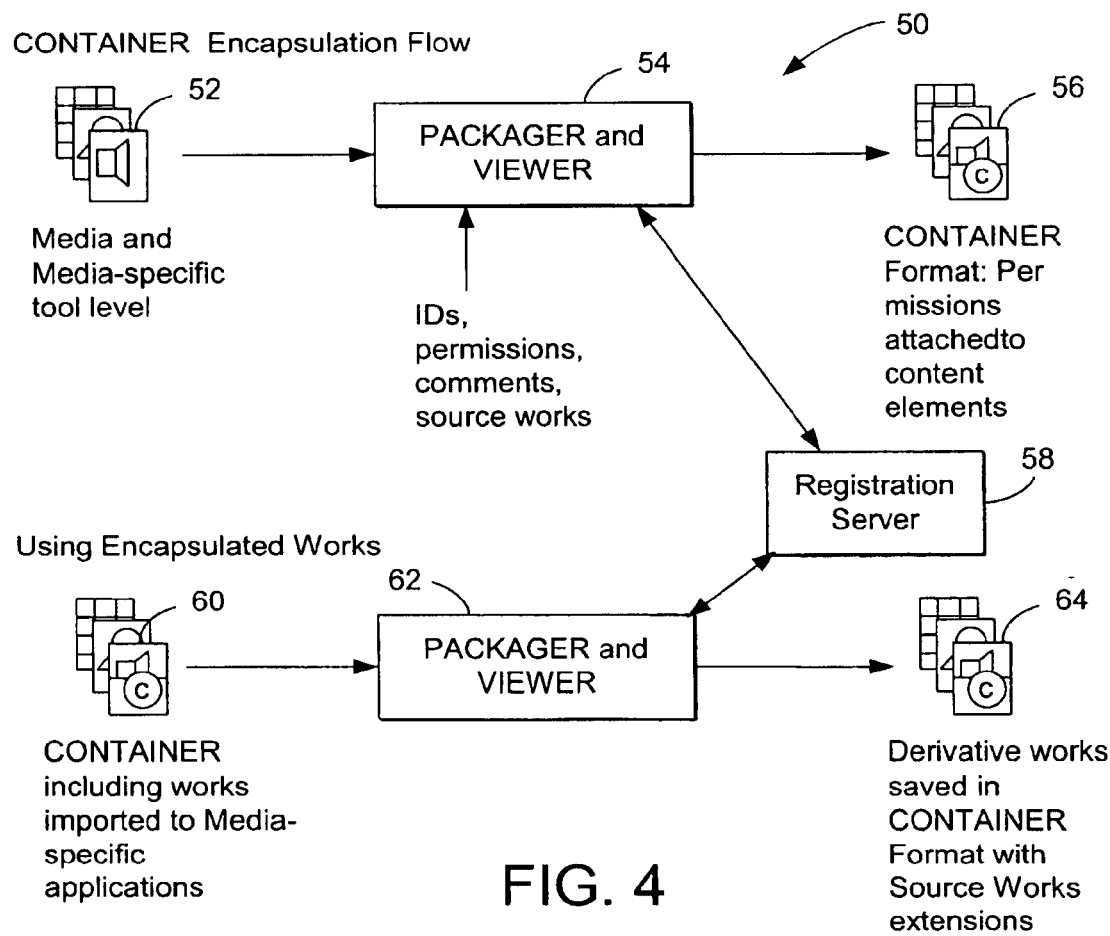
FIG. 4 illustrates a schematic diagram of a system which is constructed according to the invention and which provides for managing copyrighted electronic media assets.

FIG. 4 illustrates a copyright management system 50 constructed according to the invention. Specifically, FIG. 4 illustrates how copyright permissions will be integrated into the multimedia production environment using the described CONTAINER format. The media is first formulated as individual content elements 52 that are created and authored by media-specific tools, such as text editors, graphics tools, audio design tools, and digital video production tools. In the conventional production environment of the prior art, the elements 52 would simply enter a multimedia asset library, ready for use in production. No copyright information whatsoever would typically be affixed to the data objects prior to archiving.

In system 50, on the other hand, content element-specific permissions are affixed to each data object 52 before passing on to the next level of production or on to archiving. In one embodiment of the invention, the system 50 incorporates a PACKAGER 54 within a stand-alone application to affix permissions and other related authorship information to the data 52, such as described in connection with FIG. 3. Alternatively, the PACKAGER 54 can be directly integrated into the media-specific tools of the developers; and, as such, the PACKAGER 54 becomes a "plug-in" tool for commercially available graphics, video, and sound development applications based on the PACKAGER software kernel.

After packaging by the PACKAGER 54, the heterogeneous content elements 56 are registered on a registration server 58, and, for example, released to the production library. During this stage of production, a multimedia authoring or scripting environment can be used to create an interactive multimedia program which is a composite of these archived elements 56. The control characteristics and asset utilization of the program embodied in the control "script" may also have an affixed permissions header. Thus all of the component assets will be protected in a similar fashion.

For derivative uses of packaged CONTAINERS such as the packaged elements 60 of FIG. 4, a VIEWER and PACKAGER 62 can be utilized as a plug-in to the associated application software which generated the media of CONTAINER 60 in the first place, so that editing and saving of the CONTAINER can occur. Such modifications and saving correspond to a "derivative use," as described herein. Once the works 60 are modified and packaged into a derivative CONTAINER 64, including a Source Works Extension, they too are registered on a registration server 58 (illustrated as a single server, for ease of illustration) for future licensing transactions, and, for example, released to a production library.

The system 50 thus provides an effective strategy for managing both in-house and externally obtained copyrighted assets. In accord with one embodiment of the invention, a two-tiered rights clearing scheme is provided for multimedia program integration, in which both the encapsulated minimum permissions and the auxiliary permissions of all incorporated works are reverified prior to compilation. The specific content of this combination of permissions, including the permissions introduced by the creator of the composite work, will dictate what sort of authorization is required at execution time. Upon remote execution of the compiled multimedia program, a spectrum of authorization schemes are possible, from free execution, to the networked authorization of individual copyrighted assets. The licensing functionality of the PACKAGER/VIEWER kernel is applicable during execution as well as during production.

Figure 5:
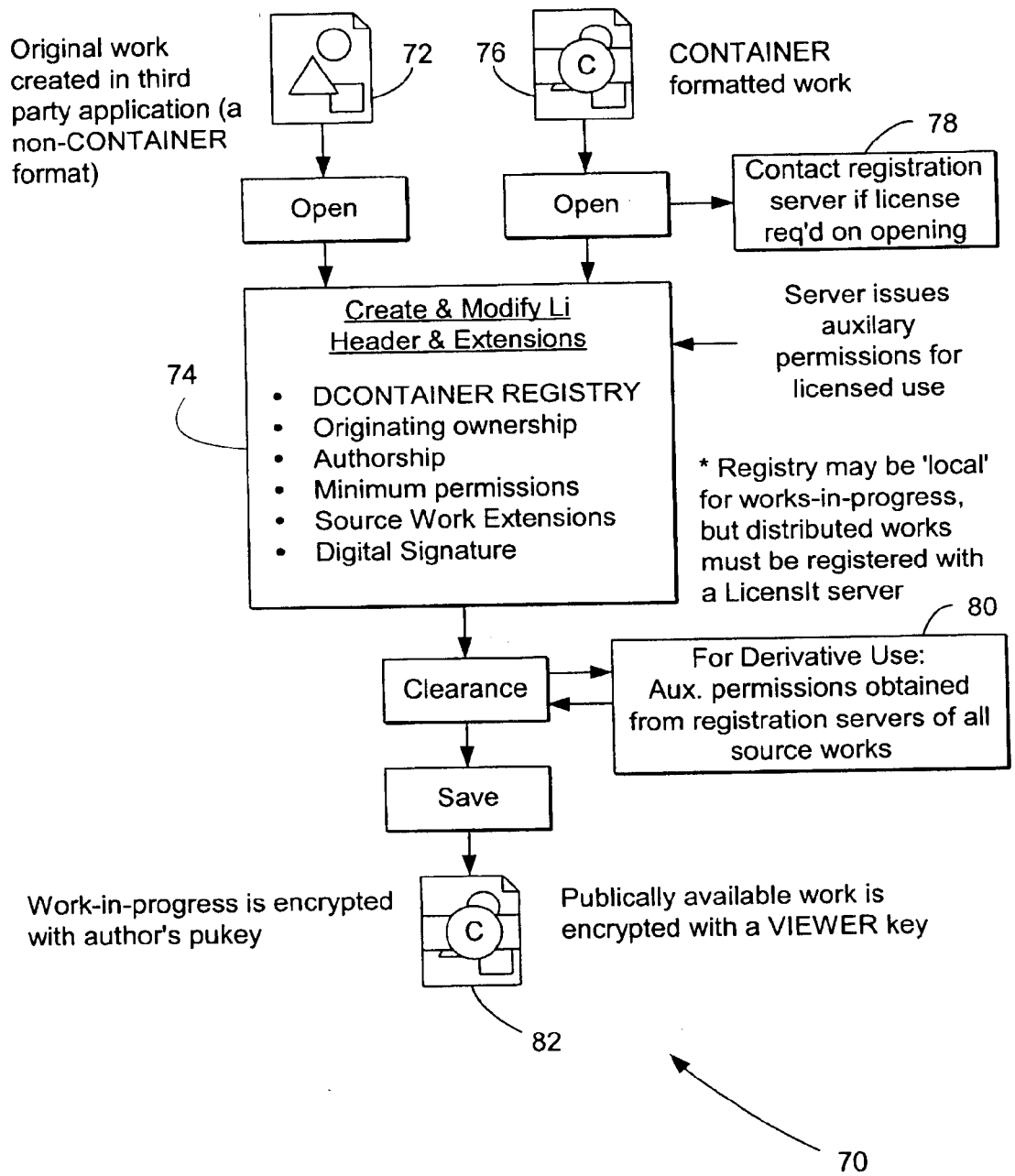
FIG. 5 shows one illustrated use of the invention in the management of copyrighted GIF files.

For illustrative purposes, FIG. 5 shows a system 70, constructed according to the invention, which only manages copyrighted GIF (graphics files) media. The GIF CONTAINERS are created and/or modified through VIEWER and/or PACKAGER systems, such as described herein, and are managed through a registration server. FIG. 5 shows, in particular, initial document processing, use-based licensing, header and extension maintenance, source work copyright clearance, local and remote server registration, and encrypted file formatting. Preferably, the system 70 is based on TCP/IP.

The major functional sections of system 70 include opening files of appropriate types, creating and modifying headers and extensions, providing permissions clearance for included sources works and attached performance releases, and CONTAINER formatting, encryption, and saving. Each of these sections is described below:

Opening Files

CONTAINERS are loaded into the system 70 once packaged by a PACKAGER. For example, an original work 72 created in an application environment is opened in that environment and formatted by a PACKAGER into a CONTAINER 74. Alternatively, an existing CONTAINER 76 can be opened by a SYSTEM EXTENSION (and VIEWER if needed), modified if desired, and stored as a CONTAINER 74.

Figure 5A:
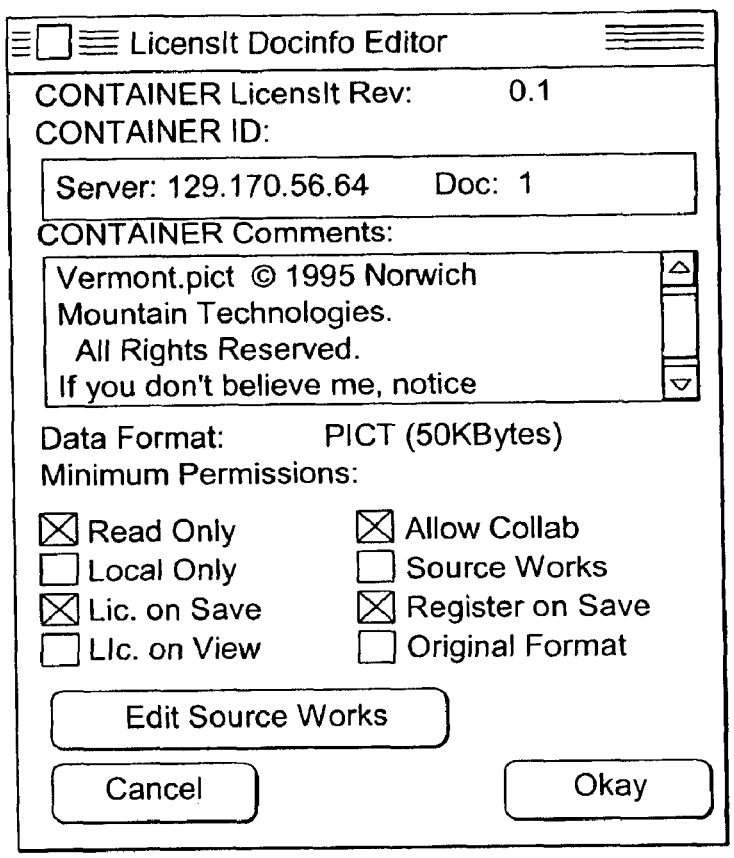
FIGS. 5a and 5b show illustrative dialog boxes displayed to a user of the system of FIG. 5.
Figure 5B:
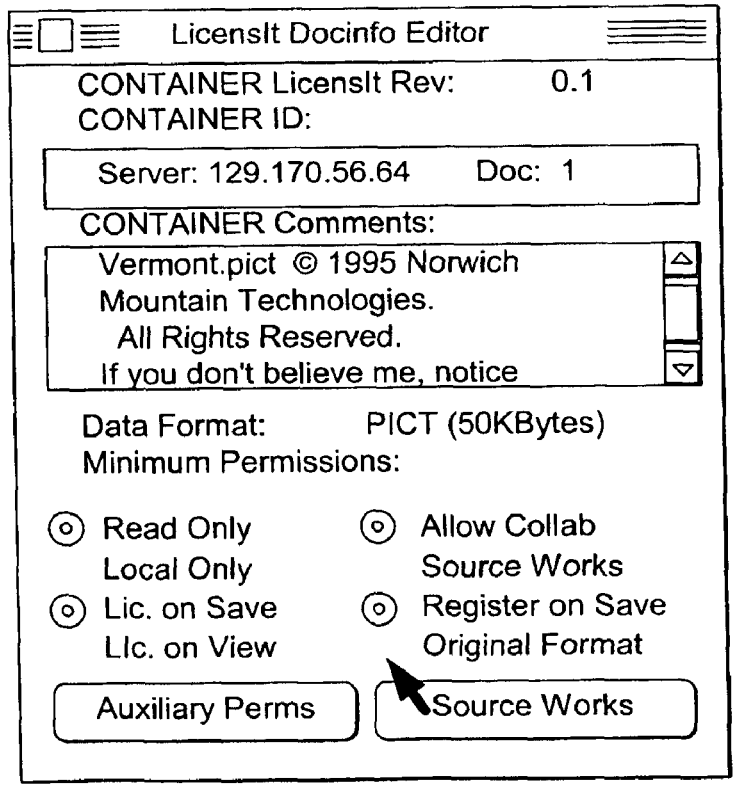

More particularly, media is opened and available to the user through a combination of the application which created the media (i.e., the VIEWER) and a SYSTEM EXTENSION. In the case of raw GIF files, the images are displayed and a header editing dialog box appears to the creator, such as shown in FIG. 5a, indicating that the system 70 is ready to start the formatting process. For CONTAINER-formatted files, a dialog box appears listing basic information for the main file, such as shown in FIG. 5b; and similar information is listed in a scrolling window for each of the Source Works.

The CONTAINER's minimum permissions (obtainable and resident, for example, within any CONTAINER) and any auxiliary permissions (obtained from an authorization server during a licensing transaction) will dictate how the opened file may be used. To encourage browsing and fair use of CONTAINER-formatted works, the publicly distributed CONTAINER files will typically have sufficient minimum permissions to allow local viewing, at least, and sometimes unlimited local derivative use. Publicly-distributed files which allow local viewing can be opened by the SYSTEM EXTENSION (and VIEWER, if needed); and files which require licensing to be opened, or working files which have not yet been publicly registered, must be opened with the user's key.

Publicly distributed files are registered on a registration server, and if encrypted, the key resident on the server is passed to the user via a secure channel. Some of these files will require licensing at viewing time, meaning that auxiliary permissions must be obtained. The auxiliary permissions files, or certificates, will be encrypted based upon the registered user's key, as are works-in-progress (not registered, and possibly with incomplete sources works clearance).

Creating & Modifying Headers & Extensions

System 70 has several interfaces for creating or modifying the headers and extensions which embody the CONTAINER format. The Container Header, e.g., the header 21 of FIG. 1A, is primarily derived from attributes of the enclosed media within the CONTAINER. These attributes are displayed in the DocInfo Editor and Viewer windows shown in FIG. 5a. The Container ID, e.g., the ID 22 of FIG. 1A, denotes the CONTAINER's registration server 78 and the index number of that CONTAINER on that server. Non-local document IDs can only be assigned if there is a valid registration certificate associated with the file. Local Container IDs are encrypted, but can only be changed by the document owner. Container ID maintenance is typically handled through a computerized dialog box.

Permissions Clearance and Source Works

For Source Works Extensions, e.g., the Extensions 24 of FIG. 1A, the Container ID information is displayed in a scrolling view for the set of source works associated with the current file. A dialog box allows the CONTAINER IDs of additional works to be specified. Permissions information can be obtained by double-clicking an entry on this list. A transaction with the registration server 78 of the source works 72, 76 may be initiated by selecting the appropriate CONTAINER ID. Note that the user may choose to ignore clearances for locally-generated source works.

To enable permissions clearance for source works, public registration will not be permitted without proper source works clearance. This is ensured by the following: first, system 70 will not allow on-line registration to take place unless the permissions of the included source works (plus any auxiliary permissions) agree with the intended minimum permissions and maximum licensable permissions, the latter to be set at registration time. Secondly, the registration server 78 will not allow registration unless it is proven that the source works are clear. Clearances are required for those source works extensions with insufficient minimum permissions for the intended distribution of the derivative work. These clearances are in the form of auxiliary permissions, obtained on-line with licensing transactions identical to those discussed earlier. Given the intended minimum and licensed maximum permissions, the Source Works Manager Window displays those source works whose permissions need upgrading. The user will then select each one individually to launch a licensing transaction. Clearances that are encrypted are based on the user's key, and therefore cannot be transferred.

Private works, or works-in-progress, may not require registration, but any works which are to be publicly distributed—and, for example, encrypted using a secret key—must be registered. Users must therefore demonstrate that all source works in system 70 have been cleared prior to the registration attempt. Upon successful registration, the user of system 70 will receive an encrypted registration certificate which facilitates the saving of the CONTAINER in a publicly-viewable form. Since registration and authentication is based on a unique message digest for the file, if any changes are made to the file a new message digest must be calculated and the CONTAINER's entry in the registration-server database must be updated.

Encrypted data is preferably formatted with a secret key that is generated at the encryption event, and transported using public key encryption.

Applications compatible with system 70 are preferably based on TCP/IP, and therefore operate in the same manner as most popular Internet-compatible users.

Formatting, Encryption, & Saving

A PACKAGER of system 70 saves files in the CONTAINER format, such as described above, and preferably encrypts the data therein. Exemplary encryption schemes according to the invention include, without limitation:

Encryption is initiated by the user, who also generates the secret key which is passed to the server, by secure means, and which becomes part of the registration record for that work. Upon the grant of auxiliary permissions, the server passes the key to the licensed user as part of the certificate. This is intended for publicly registered and distributed files, and a CONTAINER is not encrypted in this way without being registered first.

Encryption based on the author's key. All local works-in-progress may be encrypted in this way, ensuring that local use is possible but unregistered public use is not.

Encryption based on another user's key. This permits collaboration while protecting the collaborative work.

With further reference to FIG. 5, once a CONTAINER 74 is saved and registered on a server 78, it may be freely distributed. Derivative users 80 can gain clearance to the CONTAINER 78 through the SYSTEM EXTENSION (and VIEWER, if needed) and in accord with the minimum permission of the CONTAINER and the auxiliary permissions from servers of all source works. The work 82 represents either work in progress, or publicly available work; and can be encrypted, such as described herein.

Figure 6:
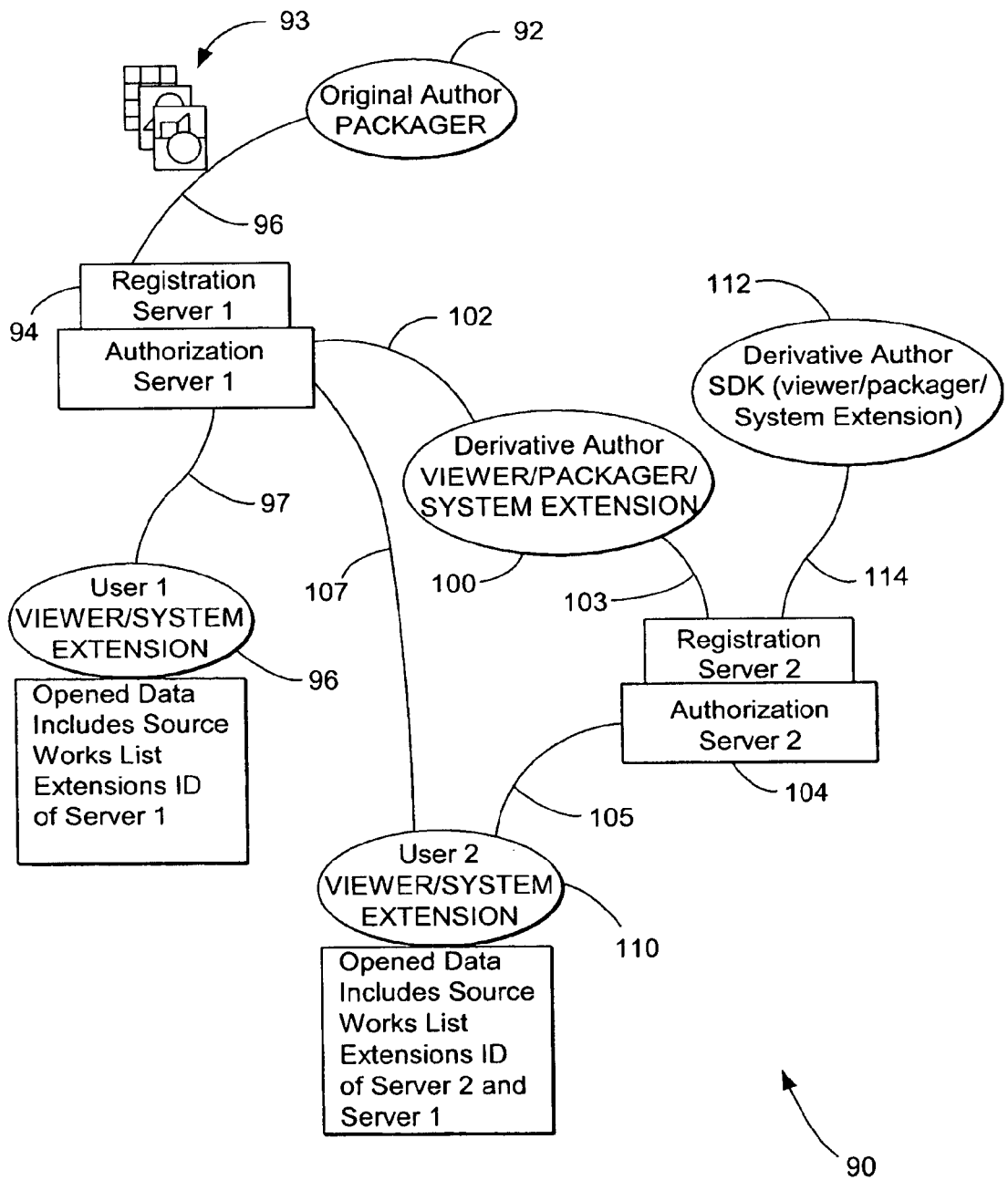
FIG. 6 shows a computer network constructed according to the invention and which illustrates selected operational uses of the invention.

FIG. 6 illustrates a computer network 90, constructed according to the invention, for managing copyrighted electronic media. In a first instance, an original author 92 generates and packages electronic media 93, e.g., such as described in connection with FIG. 3, and registers the CONTAINER 93 on registration server 94. Typically, the author 92 generates the work 93 on a computer that is connected to the network via data transfer line 96. Once the author 92 registers the CONTAINER 93, the server 94 becomes an authorization server for any subsequent access and/or licensing of the CONTAINER 93.

By way of example, user 96 has a VIEWER and is connected to the network 90 through communication line 97. The user 96 can thereby access the CONTAINER 93 through the authorization server 94 up to the minimum permissions data set forth in the CONTAINER format. Typically, the minimum permissions permit viewing of the CONTAINER; but do not permit saving and/or transmission of the CONTAINER. Should the user so desire, he or she can license the CONTAINER through an on-line licensing transaction with the authorization server 94 to obtain additional authorizations—denoted herein as auxiliary permissions—to use the media within the CONTAINER for some other use, e.g., saving or modifying the CONTAINER.

Similarly, a Derivative User/Author 100 of the CONTAINER can access and modify the contents of the CONTAINER by first obtaining auxiliary permissions to do so through the authorization server 94. More particularly, the author 100 first views the CONTAINER via the SYSTEM EXTENSION (not shown) and VIEWER and through the minimum permissions data set of the CONTAINER; then transacts a license with the Authorization server 94 to obtain the auxiliary permissions. The author 100 is thus connected via data transfer line 102 to the server 94; and has a SYSTEM EXTENSION, VIEWER and PACKAGER resident at his computer (note, for illustrative purposes, the Users and Authors 96, 100 and 120 of FIG. 6 are shown with limited detail; and generally include a computer with SYSTEM EXTENSIONs, VIEWERs and/or PACKAGERs resident at the computer).

Once the derivative user 100 modifies the CONTAINER, the CONTAINER is registered on registration server 104, through data transfer line 103, so that subsequent licensing can occur by users such as user 110. Note that user 110 must obtain licensing authorization from each server 104 and 94. This process is done automatically at the user's computer terminal. The user 120 first accesses the modified CONTAINER through the network 90 and by connection with the server 104 through data transfer line 105. Once the user 110 views the modified CONTAINER, she can seek auxiliary permissions to use the data for her intended use. Such auxiliary permissions are obtained by connecting to each of the servers 94 and 104 through data transfer lines 107 and 105, respectively.

Derivative author 112, connected to the server 104 via data transfer line 114, operates a VIEWER and PACKAGER (and, if desired, a SYSTEM EXTENSION) in an SDK environment. Briefly, the SDK indicates a "Software Development Kit" and enables developers of advanced multimedia applications, games, or multimedia authoring tools (including content creation applications) to incorporate System Extension, Viewer and Packager functionality into their applications in advanced ways. The SDK is appropriate, for example, when conventional OLE 2.0 compliance does not deliver the functionality or performance that the ISV demands. As above, the author 112 edits and creates multimedia works and packages them through the PACKAGER resident in the SDK to provide for registration and subsequent licensing of that work.

To maintain the authorship of, and ownership to a CONTAINER within the network 90, sourceworks extensions are used. This extension can be resident within the CONTAINER, such as shown in FIG. 1A, so that the appropriate CONTAINER authorship and/or ownership is recorded and stored in the appropriate data element within the CONTAINER. Alternatively, or concurrently, the sourceworks extension is stored on any and all of the servers 94 and 104. In this way, the owner or authors of the CONTAINER can ensure persistence through generations of derivative use. Further, use information can also be stored within the sourceworks extension, so that, for example, an owner of the server 94 or 104 can independently track the use of his or her copyrighted works simply by downloading the information at the server 94 or 104.

In general, each of the servers 94, 104 are owned and operated independently from the other. By way of example, one typical owner of the server 94 is a multimedia house which generates copyrighted works for sale and distribution. Such an owner thus seeks to restrict access to the media to authorized users, thereby protecting the copyright.

Each of the servers 94, 104 also provides selected use-base information about the CONTAINERS registered and licensed through the servers. Specifically, the selected use-base information provides a way to assess charges to the owners of the servers for services rendered in connection with the servers 94, 104. The use-base information is available by physically accessing the server 94, 104; but is more conveniently obtained by phoning the server and downloading the information directly. This information is not available for general users; but is typically available only to the administrator who set up the servers 94, 104 in the first place. This administrator can, for example, receives fees from the respective owners of the servers 94, 104 as part of this arrangement.

For example, such an administrator would make revenue for several transactions and sales shown in FIG. 6, including: (A) registrations of CONTAINERS on both registration servers 94, 104; (B) one licensing transaction for auxiliary permissions for user 96; (C) two licensing transactions for auxiliary permissions for user 110; (D) two PACKAGER modules resident at the computers of Author 92 and Derivative Author 100; (E) two registration modules to configure the servers 92, 104; and (F) one SDK module resident at author 112 (typically, the SDK includes a SYSTEM EXTENSION, VIEWER and PACKAGER).

Those skilled in the art should appreciate that FIG. 6 is illustrative only, and that many other configurations of a computer network are possible within the scope of the invention. For example, the network 90 can include a multitude of registration and authorization servers; and any connected computer which has the SYSTEM EXTENSION (and VIEWER, if needed) can access media on the network up to the minimum permissions authorized by the minimum permissions data set within the CONTAINER housing the respective media.

The sections below provide more detail about the invention, and include descriptive and operational commentary of the SYSTEM EXTENSION, VIEWER, sourceworks information, User Registration & Certification, the PACKAGER, SDKs, registration servers, and authorization servers, among others.

VIEWERs and SYSTEM EXTENSIONs

In conjunction with the SYSTEM EXTENSION, the VIEWER allows viewing and editing of graphic, image, video, audio, and textual objects that are packaged into a CONTAINER in accord with the invention. Where objects are individually packaged, viewing and editing will be done within the window of the source application or designated viewer. Where objects are content elements within a compound document, in-place viewing and editing will be common, with an external window session being optional. Data objects—i.e., media—that are packaged according to the invention can be dragged and dropped, for example, between OLE 2.0-compliant applications such that all attribute information contained in the CONTAINER remains intact during such an operation.

The SYSTEM EXTENSION is required for viewing and editing any CONTAINER. The PACKAGER and TOOLBOX are complementary to the SYSTEM EXTENSION and one is required to package media within a CONTAINER, e.g., the CONTAINER 20 of FIG. 1A. Typically the PACKAGER or TOOLBOX is required to create derivative works from a CONTAINER; but only the SYSTEM EXTENSION is required by developers when the minimum permissions of the source works do not require clearance. This might be common for so-called "public domain" free use of works.

Figure 7:
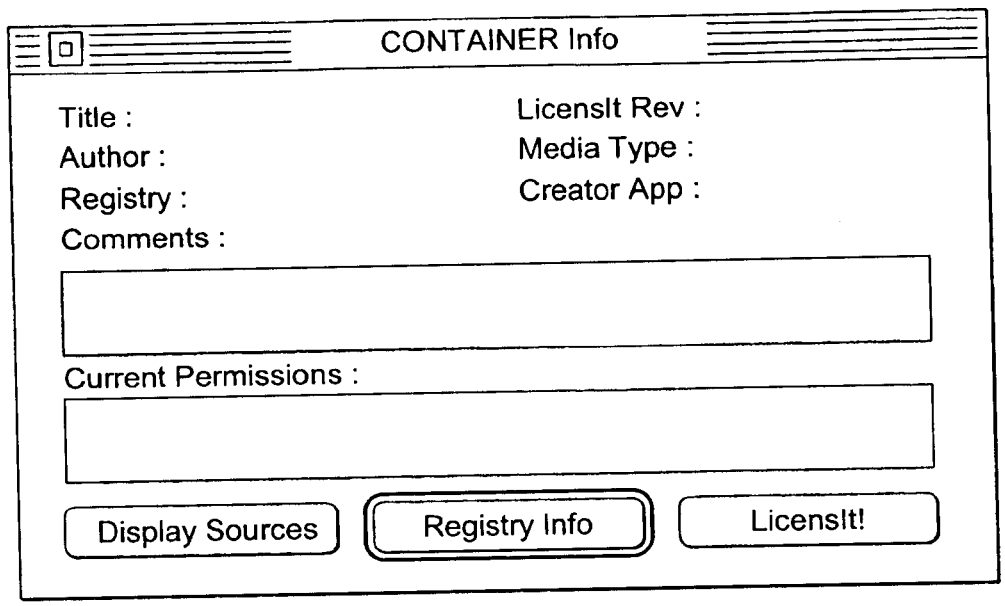
FIGS. 7–7h show illustrative computer displays for use with a system constructed according to the invention, such as the network of FIG. 6.

The SYSTEM EXTENSION examines certain attribute information encapsulated with the data object in compliance with the CONTAINER format. Operations on the data object from within the VIEWER or editor are restricted based on the minimum permissions encapsulated with the data object and any Auxiliary Permissions subsequently obtained for the data object. By way of example, the "Container Info" window of FIG. 7 provides a local summary of the document, including all available minimum and auxiliary permissions.

Figure 7A:
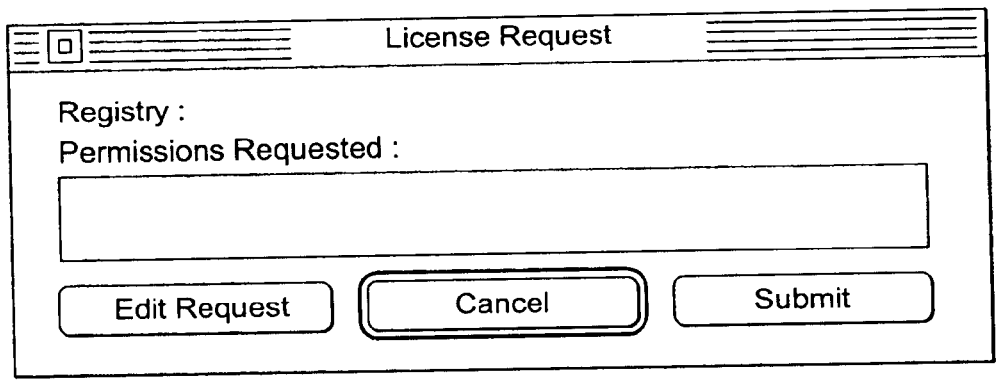
Figure 7B:
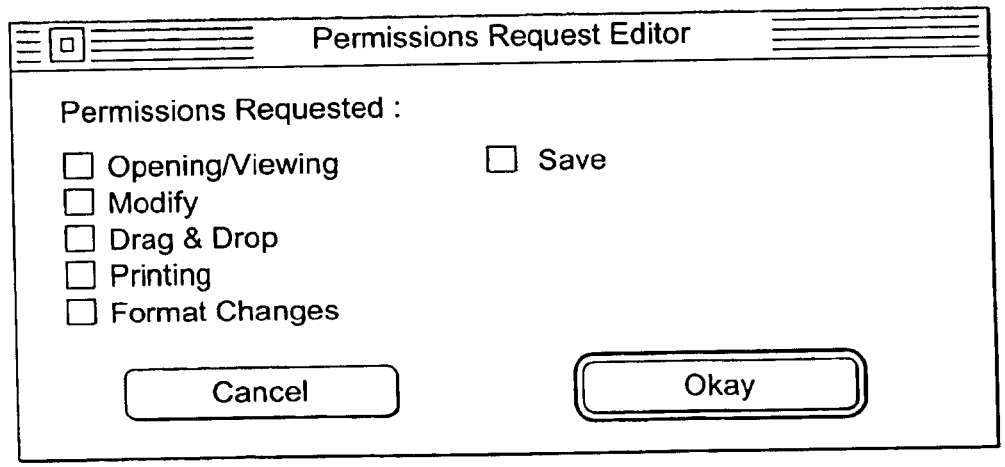

The SYSTEM EXTENSION also facilitates on-line licensing of CONTAINER-packaged works. Based on registration information encapsulated with the data, i.e., the Container ID, the SYSTEM EXTENSION contacts the CONTAINER's Registration Server and initiates an authorization transaction. After the user is authenticated (typically utilizing the user's RSA digital signature, whereby the user's key is stamped by a certification authority), the user uses a template-like interface to request auxiliary permissions, such as shown in FIG. 7a. If the permissions request does not match the user's requirements, the request may be edited, such as shown in FIG. 7b. Based on the available Transaction Rules in the database for the user's classification, licensing terms are presented to the user, such as shown in FIG. 7c. If the terms are accepted, a digital certificate is issued containing the auxiliary permissions for that specific derivative use and encrypted to that specific user.

The License Request window, such as shown in FIG. 7a, is the entry point for licensing transactions. The Registration Server is identified and the set of requested permissions is displayed. If the User recently attempted an unauthorized operation, the permissions displayed are those required by that operation. The user has the option to edit the request, such as shown in FIG. 7b, to proceed with the transaction, or to cancel out. When the user has submitted the Request, a License Agreement, exemplified in FIG. 7c, is returned to a display terminal of the requesting user. This interface, such as shown in FIG. 7c, allows the user to verify the terms of the agreement and to agree to those terms.

The SYSTEM EXTENSION can be used to obtain extensive information about the authorship, ownership, and licensing terms of a creative work prior to any licensing transaction. This information may be a combination of data permanently encapsulated with the object, including for example authorship and basic document information, and information stored on the registration server, including for example copyright ownership, licensing terms, royalty schedules, and other augmented document Information. FIG. 7d illustrates the typical information which is available from the Registration Server and which can be displayed in a Registry Info window.

Source Works Information

Figure 7E:
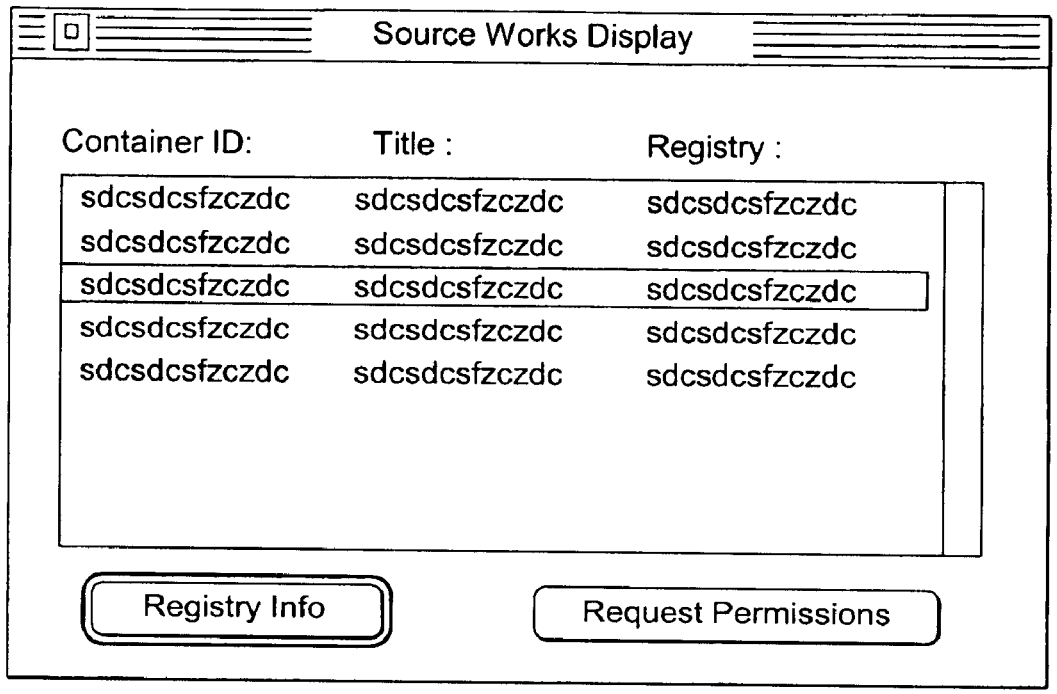

The SYSTEM EXTENSION can also be used to obtain source works information for the media object. The Sources Works Display, for example and as shown in FIG. 7e, presents the electronic record of any work from which the current work is derived, and the available information about each of those works.

User Registration & Certification

A user who wishes to engage in an on-line transaction with a REGISTRY typically presents an RSA-based, network-standard digital signature signed by a recognized Certification Authority. Accordingly, SYSTEM EXTENSIONs and PACKAGERs can contain RSA-based standardized procedures for creating and managing public/private key pairs, for engaging in certification transactions, and for becoming registered users. The Certification Authorities require human intervention when authenticating an individual's personal information. When valid information is received, the individual's key is stamped with a unique code from the Certification Authority which recognizes its authenticity. This certification is apparent before anything is encrypted to that key, and is apparent when the key is used to verify a digital signature (which can only have been signed by the individual using the matching key).

PACKAGER

The PACKAGER is used by authors and publishers to encapsulate authorship, ownership, minimum use permissions, and source works information with a creative work and in a secure package. During this encapsulation, the original binary file format of the creative work is preserved. An object created by the PACKAGER can stand alone, or can be incorporated in a compound multimedia CONTAINER. The PACKAGER is required for any editing sessions which involve CONTAINER-packaged works and which demand clearance for derivative use.

During an editing session, the PACKAGER maintains a list of all CONTAINER-packaged source works, their minimum permissions, and any auxiliary permissions which have been granted to the current work in progress. The Source Works Manager window, such as shown in FIG. 7f, allows the developer to easily see the status of permissions for each work, to obtain detailed authorship, ownership, and licensing information from the source work's registration server, and to selectively obtain auxiliary permissions as required for each source work.

Figure 7F:
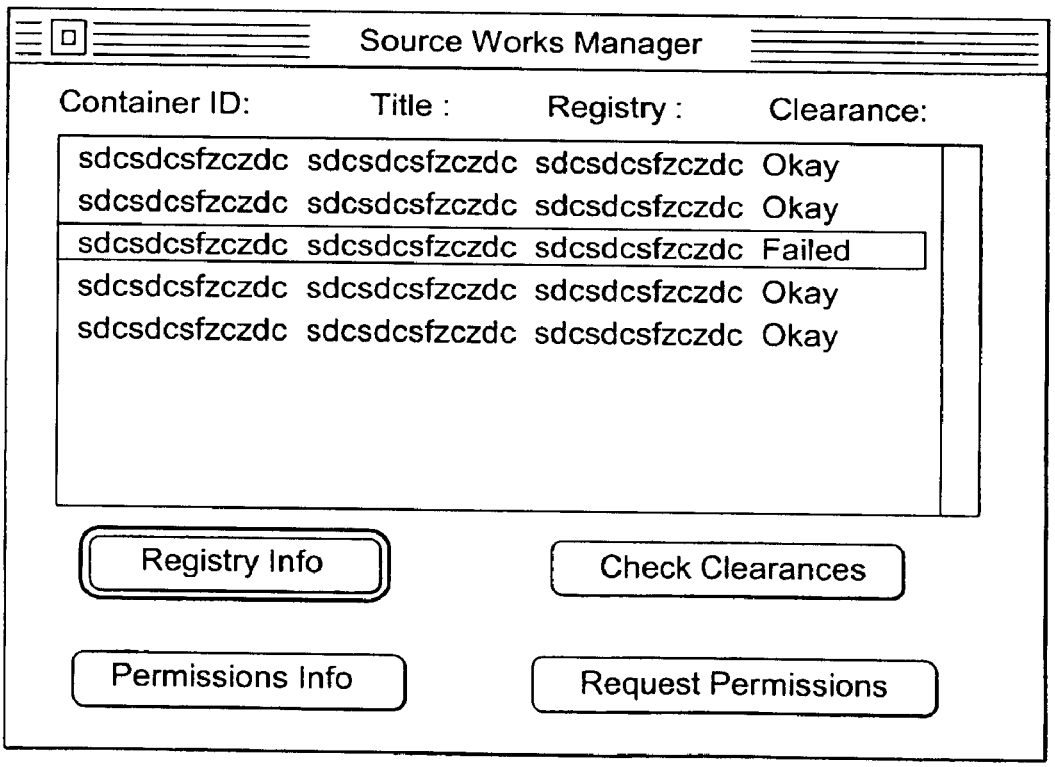

For example, the user can command the display of all CONTAINER-packaged source works from the Source Works Manager window of FIG. 7f. For each individual source work, the user may review the minimum permissions and, if available, any auxiliary permissions which have been issued. If the user chooses to obtain auxiliary permissions or to upgrade the current set displayed, a licensing transaction is initiated with the source-work's registration server.

Alternately, the PACKAGER can prompt the user to upgrade the permissions. This happen during the registration process in the following way: after preparing the CONTAINER data for the derivative work, including the requisite minimum permissions, the user executes a Check Clearance, wherein all accumulated permissions are checked against the minimum permissions which the developer intends to encapsulate with the derivative work. All sourceworks with permissions that are insufficient will be listed in the Clearance Status window.

The Check Clearances function is also applied to the set of Transaction Rules which the developer intends to load on the Registration Server. The basic principle is that a derivative work may not grant more rights to the use of a source work than what was available before the derivative work was created.

Figure 7G:
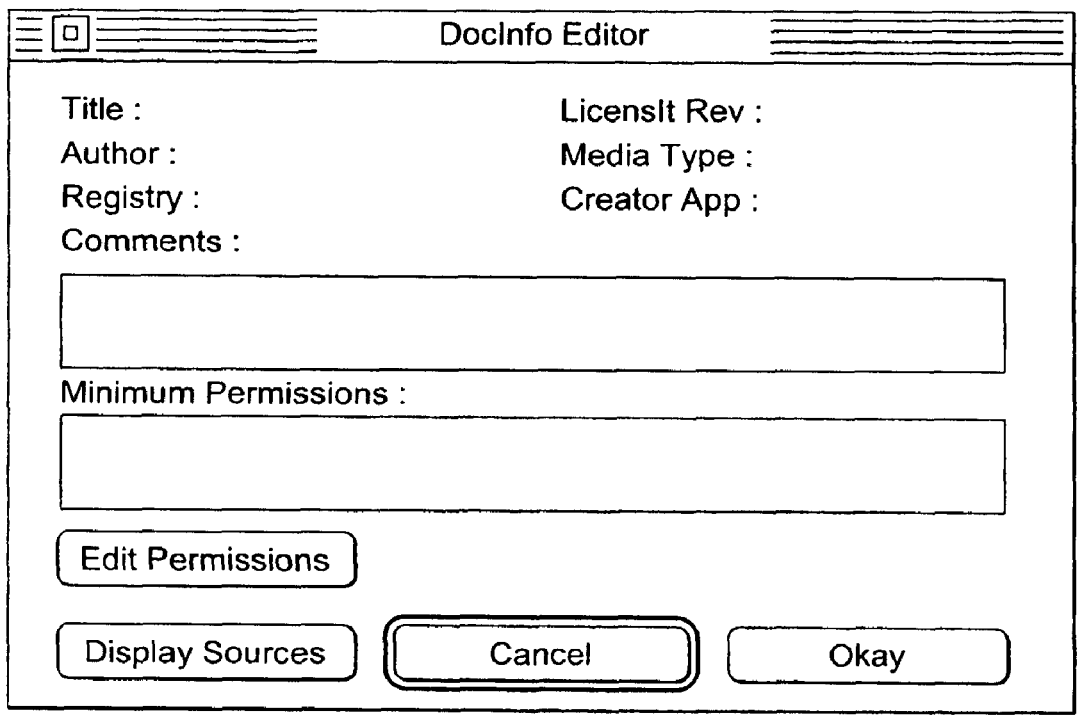

Some of the CONTAINER information which is encapsulated with the data object by the PACKAGER is prepared from context automatically. Other information can or should be manually entered or selected by the user through the a dialog window such as the DocInfo Editor Window of FIG. 7g, such as:

(1) Revision Number: The revision number identifies a version of the document format which the PACKAGER complies with.

(2) Data Format and Creator Application: This provides the type of data contained within the CONTAINER, and the application environment which created the CONTAINER. Note, however, that these fields may have reduced functionality when used, for example, with OpenDoc and OLE 2.0. In such a case, the DocInfo Editor can display the information, but it does not need to be contained as a separate DocInfo field if the Object CONTAINER can be interrogated for it.

Figure 7H:
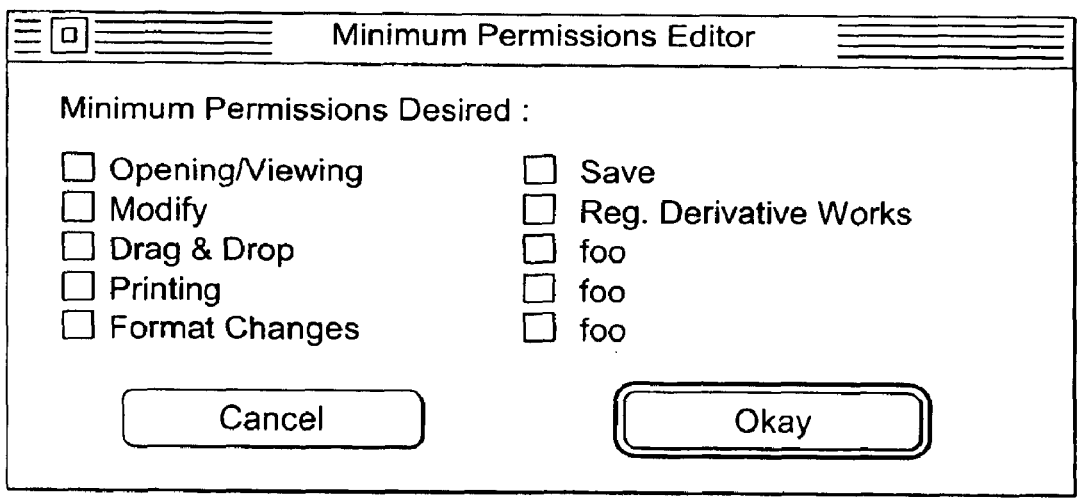

(3) Minimum Permissions: As described above, the minimum permissions template provides a way for the user to generate the minimum permissions that are encapsulated in the CONTAINER. One acceptable set of permissions, such as shown in connection with the Minimum Permissions Editor window of FIG. 7h, includes:

Opening/Viewing restricted
Modifications restricted
Drag & Drop restricted
Printing restricted
Format Changes restricted
Saves restricted
Registration of derivative works required
Store Source Works Extensions on Registration Server
Require Source Works Extensions
Restrict Source Works Extensions (4) Source Works Extensions: The identification of source works extensions is managed by the Source Works Manager, described, in part, in connection with FIG. 7f. The author of the works can also track unregistered or non-CONTAINER-packaged source works using the Source Works Manager, which allows authorship and ownership information to be textually entered into the Registration Server's database when the derivative work is registered. When information or authorization is requested, only contact information will be provided.

(5) Digital Signature: The Digital Signature provides authenticity and integrity of all information contained in the CONTAINER. One secure way to do this is to attach a RSA digital signature to the CONTAINER, which is provided by the registration server upon license. The author is a registered user in this case, and the CONTAINER is registered on a Registration Server. Appropriate evidence of certification and the CONTAINER's hash results are contained in the signature.

The PACKAGER can also enable encryption of the media within a CONTAINER. If an author chooses to encrypt the media, a random key for the media is generated; and during a secure registration transaction with the registration server—such as after a log-on and once the author proves she is authorized to use the server—the secret key is passed by either (i) a secure communication channel, or (ii) a certificate that is public-key encrypted to the user's key, so that only that user may use that issuance of the secret key. This encryption method provides for strong security since secret keys are randomly generated and are unique to a CONTAINER; and the distribution of the key to the CONTAINER is handled by the server.

Those skilled in the art will appreciated that other encryption methods are suitable for use with the invention and without departing from the scope of the invention.

SDKs

As discussed above, the Software Development Kit (the SDK) enables developers of advanced multimedia applications, games, or multimedia authoring tools (including content creation applications) to incorporate SYSTEM EXTENSION, VIEWER and PACKAGER functionality into their applications in advanced ways. The SDK is appropriate, for example, when conventional OLE 2.0 compliance does not deliver the functionality or performance that the ISV demands.

The SYSTEM EXTENSIONs, VIEWERs and PACKAGERs of the invention operate with most OLE 2.0-compliant content creation tools and with most tools that create compound works. The SDK permits the developers to follow their own coding standards but still take advantage of the invention.

Registration Server

The Registration Server of the invention contains the set of services used by information creators who want users of their works to be able to easily identify ownership, obtain licensing terms, and license those works on-line. The Authorization Server module is the set of services those information users (who may also be information creators) will use to obtain access to information and license those works. The Server maintains a database of registry information pertaining to creative works which rights-holders are making available for commerce.

The process of initiating a database entry for a work is called Registration. The act of processing a user's request for augmented permissions is called Authorization or licensing. Before starting a transaction with the Server, the PACKAGER does the following:

Verify that the user is a registered user. It will look for the user's RSA key with a certification stamp from an approved certification authority. Preferably, user registration capabilities are built into all VIEWERs and PACKAGERs.

Ensure that the user completes the Transaction Rule Templates, used in designing the licensing rules for all available classes of users. This should be completed prior to contacting the Server because they determine whether sufficient clearances have been obtained.

Ensures that the user completes the Ownership Information Template, which is the textual information that a user of the work would receive when using the VIEWER to obtain further ownership information, beyond what might be encapsulated in that package.

Verifies that sufficient clearances (auxiliary permissions) for all source works used in the current work-in-progress are available to the PACKAGER.

If the clearances are insufficient, the PACKAGER guides the user through the series of authorization transactions required to get the necessary permissions.

When sourceworks clearances are complete, the PACKAGER performs a one-way hash function contained, for example, in an RSA Digital Signature and which become part of the works' database record for later authentication.

As a last step, the PACKAGER contacts the Server.

The PACKAGER testifies to the Server that the user is authentic and that all sourceworks (if any) used in the work being registered have been properly cleared. The Server then assigns a unique registration ID to the CONTAINER (based, for example, on the server's ID and the number of documents registered on the server) and builds the database record based on the information held by the PACKAGER.

In "signing" the CONTAINER, the PACKAGER preferably assembles a RSA Digital Signature for the package. Contained within the signature are the registration ID and the results of the one-way hash on the document data. The signature is encrypted to the User's key, thus demonstrating authenticity.

Authorization Server Module

Before starting a licensing transaction with the Authorization Server, the SYSTEM EXTENSION does the following:

Determines that available permissions (minimum and auxiliary) are not sufficient to perform the user's desired action.

Verifies that the user is a registered, which is required only if a transaction with the Server is necessary.

Testifies that the user is registered and presents the authorization request (a request for specific auxiliary permissions) to the Authorization Server. The user's classification is also transferred and stamped with certification from the associated Certification Authority.

Based on the requested auxiliary permissions and the classification of the user, the Server presents its terms for licensing. These terms are viewable within a display window and can include, without limitation, any of:

Actual permissions granted

Payment options. When a choice of on-line payment methods are available, a provider-specific window becomes available after the method is chosen. When some other method is required, an appropriate window to facilitate the payment is displayed.

Request human intervention. The user or the Server may not be satisfied with an on-line authorization request. In that case, the option exists to pursue some form of human intervention. The options which the registering party has made available are displayed.

Accept terms. When the licensing terms are accepted, a packet enabling the auxiliary permissions is transferred to the user's computer. These are encrypted to the user and thus are non-transferable.

The systems and methods of the invention encompass novel methods and tools which will enable creators of networked multimedia programs to identify their media and to claim their rights. This is enabled, in part, by bundling the copyright information with the data element and by formatting the CONTAINER in a manner which maintains this identification and attribution so that it persists with the copyrighted work through generations of derivative use. The invention therefore demonstrates the application of copyright permissions to a hierarchy of network-distributed data objects to effectively protect owners' rights.

This invention also facilitates the licensing of multimedia content by different classes of users. In accord with the invention, a desktop tool can be integrated with selected viewing or production tools to feature an interactive licensing template. The invention thus demonstrates the integrated support of hierarchical permissions headers in the production environment, and demonstrates networked interactive licensing within the production environment based on hierarchical permissions.

FIG. 8 illustrates one acceptable process flow for managing copyrighted works in accord with the invention and corresponding to the methods and systems described herein.

Figure 9:
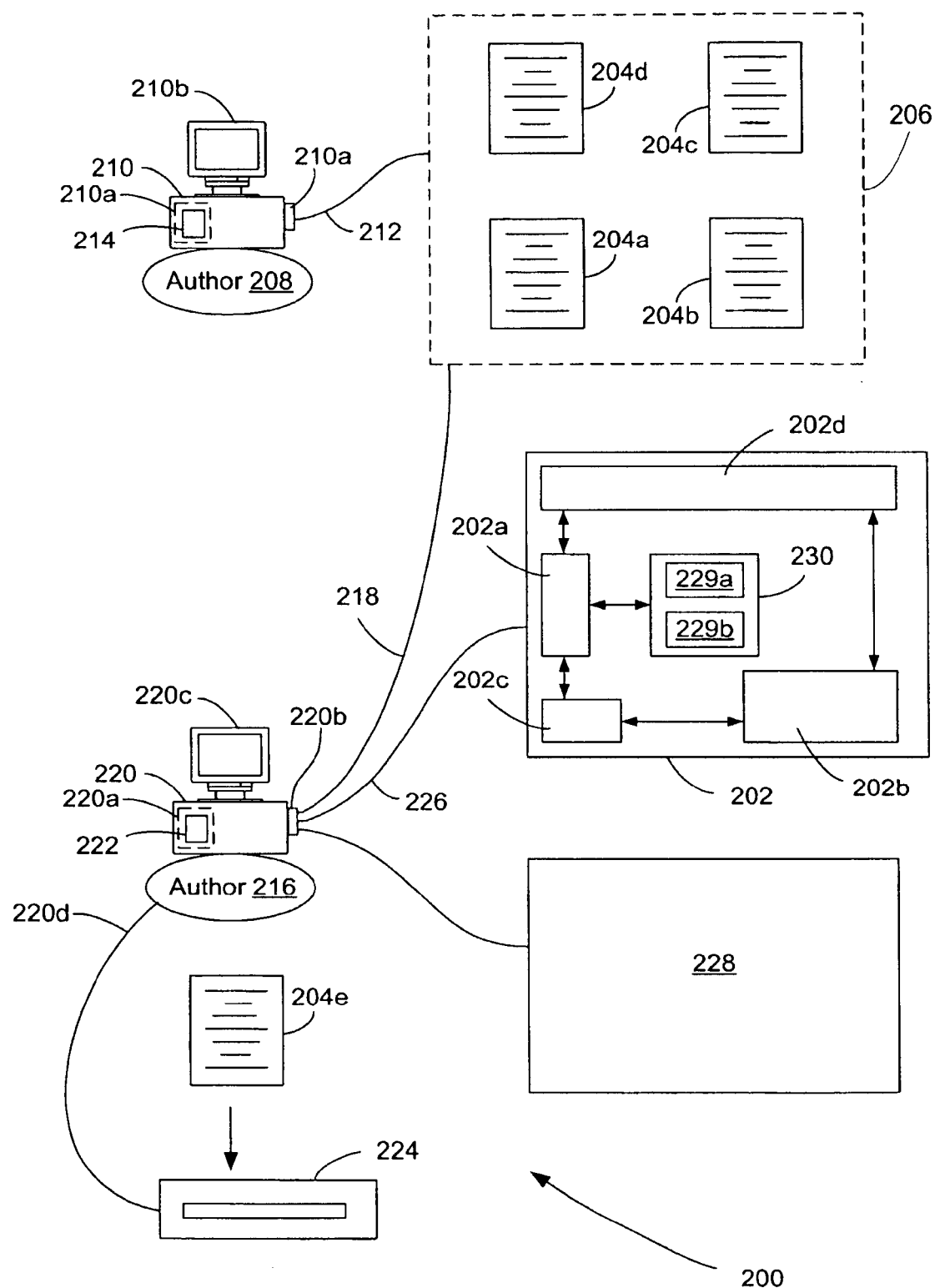
FIG. 9 schematically shows a system, constructed according to the invention, and which illustrates selective operations of a VIEWER, SYSTEM EXTENSION, PACKAGER and registration/authorization server.

FIG. 9 illustrates a system 200 constructed according to the invention. The system 200 includes a server 202 which operates as a registration and authorization server for any of the CONTAINERs 204a, 204b, 204c, and 204d stored in a library 206. By way of example, the library 206 can be a publisher's library of any or all of the original works owned by or authored for the publisher. Author 208, for example, illustrates one such author connected to the library 206 through a personal computer 210 and communication line 212. The computer 210 is a data processor that includes a PACKAGER 214 constructed according to the invention and as described hereinabove. In the preferred embodiment, the PACKAGER 214 is a software module stored within the computer's internal memory 210a to control the data processor's actions in accord with the invention. Through the PACKAGER 214, the author 208 can create and package any of the CONTAINERs 204. The computer 210 also includes a communication section 210b, to facilitate on-line communications, and a computer display 210c.

The CONTAINERs 204 are secure containers of electronic media, as described herein, and are stored in the library 206 as digital files, such as within a CD-ROM, or within a computer memory. Preferably, the CONTAINERs are stored such that a user such as User 216 can access the CONTAINERs through an on-line connection 218 between the user's personal computer 220 and the library 206.

The owner of the library 206 may also have copyrights in CONTAINERs such as CONTAINER 204e, which represents a CD-ROM of a media-packaged work that is distributed to the User 216 by mail. The CD-ROM 204e, for example, exemplifies one other published work that is created by the author 208 and packaged by the PACKAGER 214. As above, the server 202 also functions as the registration and authorization server for CONTAINER 204e.

In accord with the invention, the user's computer 220 is a data processor that includes a SYSTEM EXTENSION 222 constructed according to the invention and as described hereinabove. In the preferred embodiment, the SYSTEM EXTENSION 222 is a software module stored within the computer's internal memory 220a to control the data processor's actions in accord with the invention. A CD-ROM 224 drive is preferably connected to the user's computer 220 via data line 220d to facilitate access to CD-ROM files such as CONTAINER 204e.

Through the SYSTEM EXTENSION 222 (and a VIEWER, if needed), User 216 can access any of the CONTAINERs 204a–e up to the minimum permissions authorized by each of the CONTAINERs. By way of example, the minimum permissions data set within each CONTAINER typically authorizes the User 216 to view the CONTAINERs 204a–e; but not to download, modify, save or otherwise electronically transfer the CONTAINERs. The data transfers required to access the CONTAINERs 204a–d up to the minimum permissions data set occur through communication line 218; while the only data transfers required to access the CONTAINER 204e up to its minimum permissions data set are between the computer 220 and the CD-ROM drive 224.

If the User 216 wishes to augment the authorizations to any of the CONTAINERs 204, for example to modify or save the CONTAINER at the computer 220, she must communicate with the server 202 and transact a license with that server. The data processor 220 thus includes a communication section 220b that is connected for data transfers, over communication line 226, with a compatible communication section 202a of the server 202. Upon selection by the User 216, the VIEWER 222 determines from the selected CONTAINER 204 that authorization server 202 is assigned to handle all licenses to that CONTAINER, and the SYSTEM EXTENSION controls the computer 220 to connect to the server 202 at the right address so that an on-line licensing transaction can occur.

Specifically, once the user 216 indicates that additional permissions to the CONTAINER 204 are desired, the SYSTEM EXTENSION can display selected terms to the CONTAINER, as stored within the CONTAINER or as stored within the server 202. In either case, the SYSTEM EXTENSION causes the computer 220 to generate a licensing request signal and issue that signal to the server 202. Preferably, the user 216 also designates—through the SYSTEM EXTENSION—the desired use of the media within the CONTAINER. The user 216 can thereafter accept the licensing terms to the CONTAINER 204, and, if accepted, the user 216 receives notification from the server 202 that auxiliary permissions are granted for the desired use.

In the event that CONTAINER 204 is a derivative work, the SYSTEM EXTENSION 222 determines that auxiliary permissions are also required, for example, from server 228, the server designated by the original author of the media within CONTAINER 204.

The server 202 stores transactional information about the CONTAINERs 204. For example, each license transacted through the server 202 is stored in a file 229a, such as within a computer memory 230. In this way, the owner or administrator of the CONTAINERs can assess the licensing fees generated by the CONTAINERs. Likewise, the server 202 also stores information or files 229b that set forth the number of CONTAINERs registered thereon, so that, again, the owner or CONTAINER-administrator can assess server usage. The files 229a, 229b are preferably available through the communication section 202a.

In one embodiment of the invention, the server 202 includes an internal memory 202b, connected to the communication section 202a, that stores selected information about the CONTAINERs registered thereon. For example, licensing terms to the CONTAINER 204 can be stored within the memory 202b. A relay section 202c operates to relay such terms to the processor 220 in response to a license request signal prompted by the user 216. A data comparison section 220d operates to compare the user's reply to the licensing terms, and to generate and transmit the requested auxiliary permissions when the response signals correspond to the requisite terms specified in the license information stored in memory 202b (or alternatively in the CONTAINER). Accordingly, once the user 216 receives the auxiliary permissions, that user is provided with additional authorizations to use the media within the CONTAINER 204; and the SYSTEM EXTENSION 222 enables the user 216 to access the CONTAINER 204 up to the maximums allowed in the bumped-up permissions data set.

Figure 10:
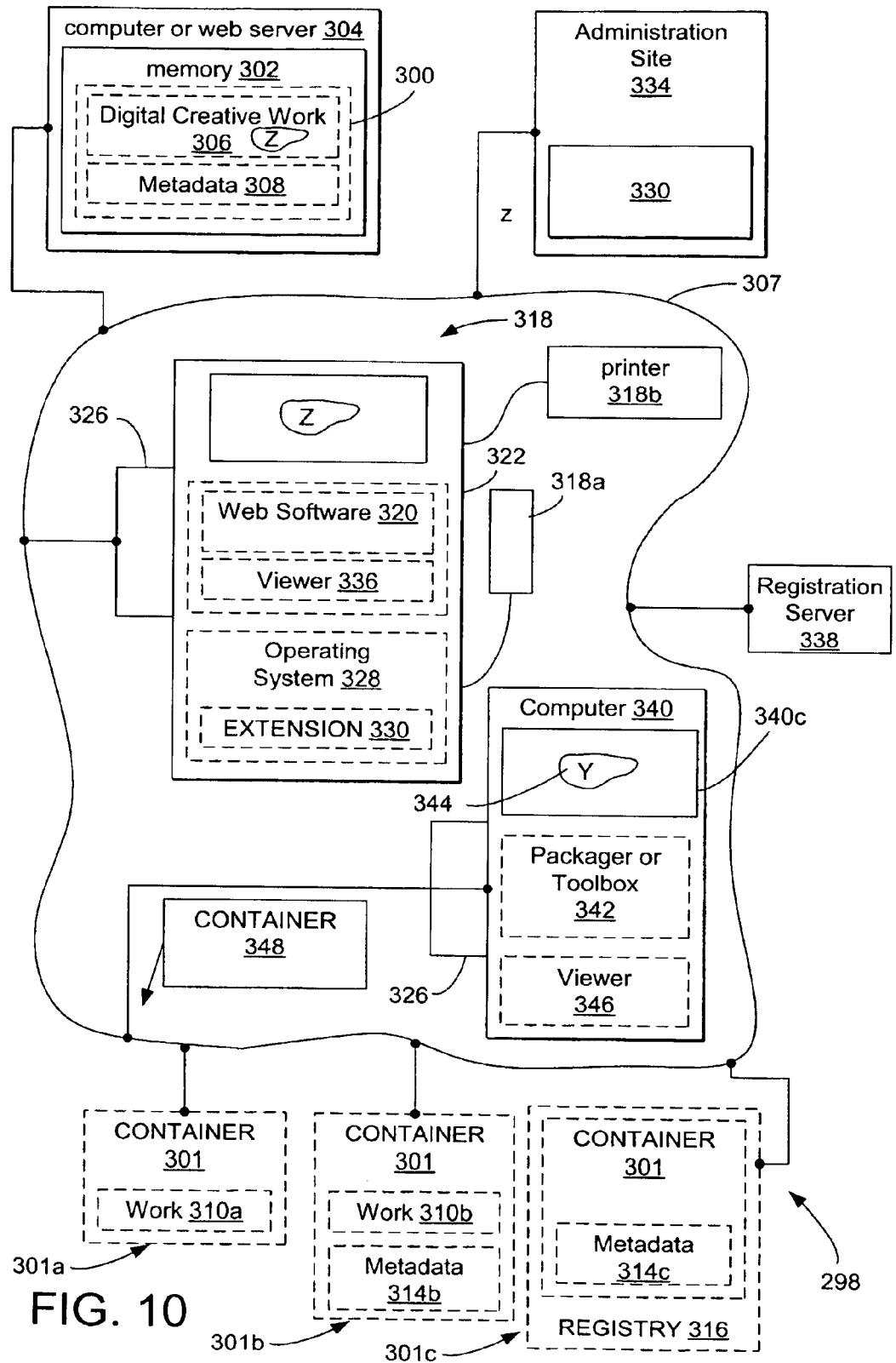
FIG. 10 illustrates various components of the invention, including a CONTAINER, REGISTRY, OBJECT, SYSTEM EXTENSION, MATADATA, DIGITAL CREATIVE WORK, VIEWER, PACKAGER, TOOLBOX, DIGITAL CONTRACT; and further illustrates certain relationships between such components.

FIG. 10 illustrates a system 298, constructed according to the invention, and provides a brief description of several components of the invention; and further illustrates certain relationships between such components. First, the system 298 provides for the making and manipulation of CONTAINERs 300 and 301. As illustrated, a CONTAINER such as CONTAINER 300 can occupy a single block of memory such within memory 302 (e.g., memory 302 can be solid state RAM within a computer 304, or ROM memory within a web server 304). Each CONTAINER has one or more Digital Creative Works and Metadata. The CONTAINER 300, for example, has DIGITAL CREATIVE WORK 306 and associated METADATA 308. The WORK 306 is the electronic expression created, for example, by an author or publisher, and is shown as a letter "Z" for clarity of illustration. The METADATA 308 provides selected information about the WORK 306; and such information can include, for example, the author's name, the minimum permissions or minimum authorized uses of the WORK 306, and licensing details.

A CONTAINER can also occupy a plurality of locations on the Internet 307. This is illustrated by CONTAINER 301, which has several parts 301a, 301b and 301c linked through the Internet 307. As illustrated, for example, the CONTAINER 301 includes DIGITAL CREATIVE WORK 310a and 310b, each at a different location 312a, 312b, respectively; and METADATA 314b and 314c, each at a different location 312b and 312c, respectively. For illustrative purposes, location 312c is here shown as a REGISTRY 316 that serves as the registration server for CONTAINER 301.

The computer 318 illustrates one of a number of users of the Internet 307. As such, computer 318 typically houses web browser software 320, such as Internet Explorer™, within internal memory 322. The computer 318 also has communication software and hardware 326 which facilitates communication with the Internet 307.

Other software is also present within the computer 318. Within the operating system memory 328, there resides a SYSTEM EXTENSION 330 which recognizes and which enables interaction with CONTAINERS such as CONTAINERs 300, 301. By way of example, a user at computer 318 can surf the WWW (i.e., the Internet 307) and locate the CONTAINER 301 at web server 304. The CONTAINER 301 can be, for example, displayed on a web page at the user's screen 332 as OBJECT "Z" that instantiates the CONTAINER 301. In the event the computer 318 does not have the EXTENSION 330 installed thereon, the CONTAINER 301 can include, within the METADATA 308, a location on the WWW 307 to find and obtain such a SYSTEM EXTENSION 330. One location, for example, can be an administrative web site 334 that is also connected to the WWW 307 with a unique web address. When requested, the site 334 downloads the EXTENSION 330 to the computer 318 so that the computer 318 can render the OBJECT "Z". Since the OBJECT "Z" is generally a graphic or text, e.g., a JPEG or Microsoft Word™ document, that was formed by a third party application software, then the computer 318 should further house, for example, a "VIEWER" 336 such as a JPEG viewer or the Microsoft Word™ application.

In operation, a user thus sees the OBJECT "Z" which instantiates the CONTAINER 300. Normally, the user at computer 318 will not notice anything different about the OBJECT "Z" as compared to any other graphic or visual within a web page. However, when the user clicks on the OBJECT "Z" by operation of the mouse 318a, then that user will be given additional information, such as the associated METADATA 308. Further, if the user at computer 318 attempts an operation—e.g., copying into another file or printing on the printer 318b—that is prohibited according to the instructions in the METADATA 308, then that user will be so notified and informed that a license is needed to accomplish that action.

By way of example, suppose the CONTAINER 300 is registered at the REGISTRY 338, which is a registration server for the CONTAINER 300. When the user at computer 318 is notified of an improper operation, the user will be given the opportunity to obtain a license to the Digital Creative Work 306 through interaction with the REGISTRY 338. The METADATA 308 specifies that registration server 338 is designated with this role; and further specifies the REGISTRY address so that the computer 318 can locate the REGISTRY 338 on the WWW 307.

FIG. 10 also illustrates a second computer 340 that represents an author or publisher of Digital Creative Works. As such, the invention provides a way to package the Work with a CONTAINER. For example, computer 340 includes a PACKAGER or TOOLBOX 342 which packages Digital Creative Work such as the work 344 on the screen 340c, here illustrated as the letter "Y". Typically, the Work 344 is made by a third party application, e.g., Adobe Photoshop™. As such, the computer 340 typically includes this software within internal memory. In FIG. 10, this software is referred to as VIEWER 346 because the application is typically the same application that is later required to view or utilize the Work 344.

Once the user at computer 340 packages the Work 344 within a CONTAINER 348, the Work 344 will have attribution for any location on the web 307. As such, the user at computer 340 can send the CONTAINER 348 onto the Internet 307 for storage, if desired, at a web site or at a REGISTRY such as REGISTRY 338. When other users, e.g., a user at computer 318 locate and access the CONTAINER 348, such a user sees the OBJECT "Y" as the instantiation of the CONTAINER 348. If the user attempts an operation that is prohibited, then the CONTAINER 348, through its Metadata, locates and phones its home, which in this example is the REGISTRY 338, to begin a licensing transaction.

Figure 11:
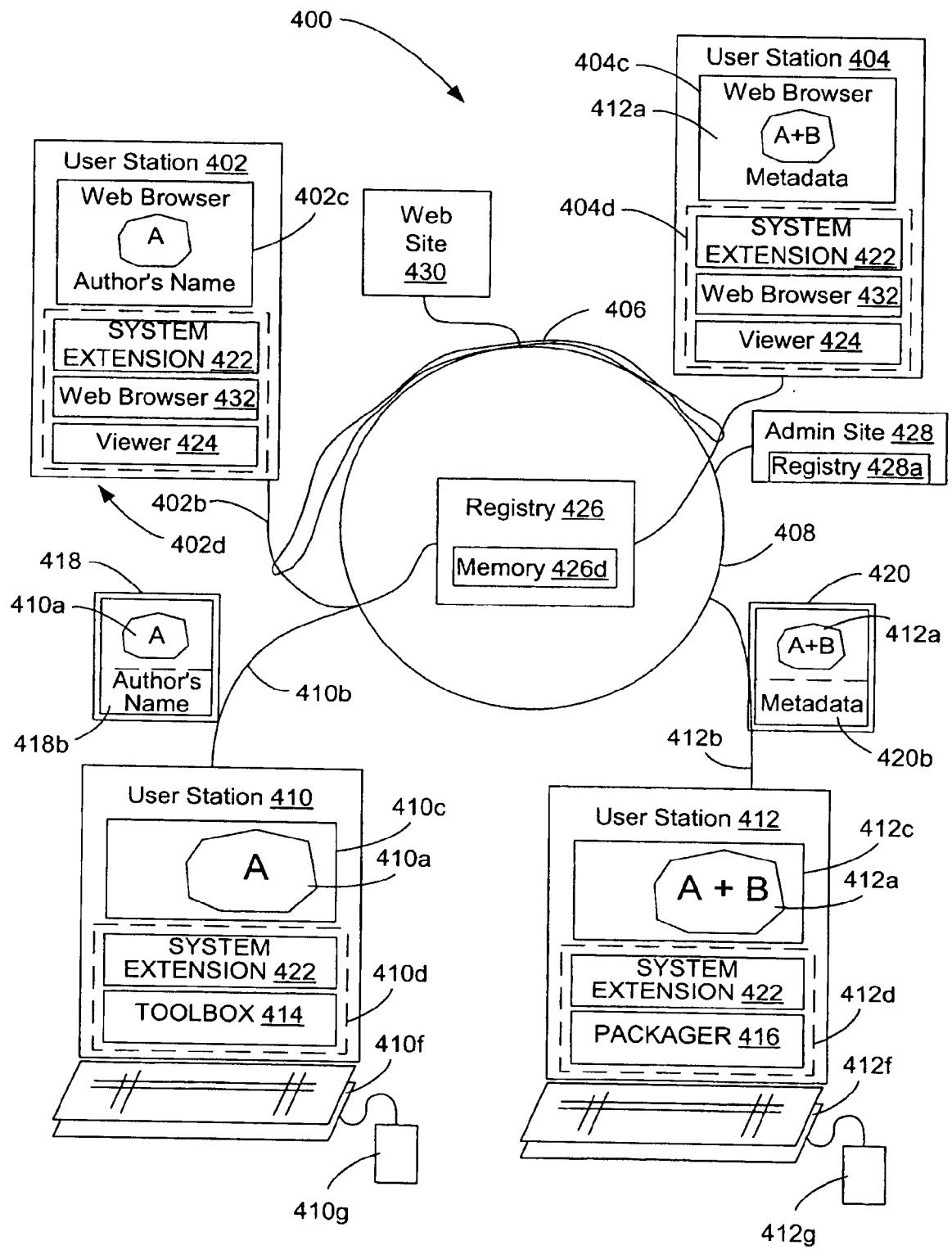
FIG. 11 illustrates a system, constructed according to the invention, for managing digital creative works, and shows one operational interaction between a CONTAINER, REGISTRY, SYSTEM EXTENSION and TOOLBOX.

FIG. 11 illustrates a system 400 constructed according to the invention. FIG. 400 further illustrates general and preferred operations and functionality of the system 400 in the management of Digital Creative Works. In FIG. 11, user stations 402 and 404 are computers for users of digital media connected to the Internet 406 and to each other via a network or Intranet 408. User stations 402 and 404 are connected to the Internet, and to the Intranet 408, via local data lines 402b and 404b, respectively.

User stations 410 and 412 are used by creators or authors of Digital Creative Works 410a, 412a, respectively; and are connected to the Internet 406 by data lines 410b and 412b, respectively. Digital Creative Work 410a is shown illustratively as an "A" on the screen 410c of user station 410; while Digital Creative Work 412a is illustratively shown as an "A+B" on screen 412c of user station 412. The Work 412a is denoted as "A+B" to indicate that the Work 412a is a combination of creative works of both authors at stations 410 and 412.

Those skilled in the art should appreciate that each of the stations 402, 404, 410 and 412 have hardware (not shown) which enables communication with the Internet 408 and/or Intranet 406. For example, such hardware often includes a modem and supporting software to facilitate communication through the Internet 408, to other users, such as through email, and to selected web sites, FTP sites, URLS, newsgroups, databases, and the like.

User station 410 also has a TOOLBOX 414; and user station 412 has a PACKAGER 416. The TOOLBOX 414 and/or PACKAGER 416 are used to create a CONTAINERs, here illustrated as CONTAINERs 418 and 420. CONTAINER 418 derives from the work 410a of station 410; while CONTAINER 420 derives from the work 410a and the work 412a of station 412. CONTAINERs 418 and 420 are shown connected to the data lines 410b, 412b to illustrate that the CONTAINERs are transmitted through, or dispersed on, the Internet 408.

Each of the user stations 402, 404, 410 and 412 has a SYSTEM EXTENSION 422 installed into an associated internal memory 402d, 404d, 410d and 412d, respectively. These EXTENSIONS 422 operate with the operating system of the associated station so as to recognize, interact with, and access CONTAINERS.

User stations 402 and 404 additionally have VIEWERs 424 installed into internal memory 402d and 404d, respectively. The VIEWERs 424 are used to view and interact with the Works within CONTAINERs. By way of example, if an OBJECT 410a is a graphic that is best viewed with a JPEG VIEWER, then the EXTENSION 422 calls that VIEWER to render the OBJECT 410a as needed to the user 402. Note that user 402 sees the OBJECT "A" as the instantiation of the CONTAINER 410. Likewise, user 404 sees the OBJECT "A+B" as the instantiation of the CONTAINER 420.

The Registry 426 operates to register selected CONTAINERs, and to negotiate as agent for any author of a CONTAINER. Preferably, the Registry 426 has internal memory 426d which can be used to store CONTAINERs, METADATA to CONTAINERs, or parts of CONTAINERs and/or METADATA. It is important to note that a CONTAINER need not reside at a single memory location. Those skilled in the art will appreciate that a CONTAINER based on object technology can be, and is intended to be, dispersed across the Internet 408 so that different portions of the CONTAINER reside at the most logical location for that portion.

For illustration purposes, FIG. 11 also shows an administrative site 428 (and associated Registry 428a), which can operate to augment the system 400, as described below; and a generic web site 430 that provides database information such as commonly provided on the WWW. As above, those skilled in the art should appreciate that the administration site 428 and web site 430 include associated hardware (not shown) to facilitate the needed communication with the Internet 408 and other users 402, 404, 410 and 412 of data therein.

In operation, the system 400 has many features, some of which are illustrated in FIG. 10. Specifically, work 410a is instantiated on the screen 410a as OBJECT "A." By way of example, "A" can represent a digital representation of a drawing or sketch by the author. By way of further examples, "A" can be made electronically, such as through a graphic artist program (using the keyboard 410f and mouse 410g) such as Adobe Illustrator™; or "A" can be hand-drawn and scanned within the computer 410 by an optical scanner, such as known to those skilled in the art.

In one example, the author of CONTAINER 418 makes the Digital Work "A" for enjoyment only; and does not choose to register the CONTAINER 418 with the REGISTRY 426. However, the author at station 410 does desire recognition as the author of the work "A," so he encapsulates METADATA 418b within the CONTAINER 418 that specifies his name. User 410 thereafter sends the CONTAINER 418 onto the Internet 406, where it is stored as a web page at the database or web-site 430.

Other users, connected to the Internet 408 and web-site 430, who have a SYSTEM EXTENSION resident at their computer, can access the OBJECT "A" of CONTAINER 418. By clicking on the OBJECT A, or through such other authorized action as specified by the author 410, such a user can additionally obtain information about the author's name in the METADATA 418a.

By way of example, the user at user station 402 is interrogating the Internet 408 through visual interaction with her display 402c of the WWW (note for clarity of illustration that no accompanying mouse and keyboard are illustrated with user stations 402 and 404; and even though they are not required, it is intended that such instruments are present). User 402 accordingly has web browser software 432 (e.g., Netscape™ and Microsoft Internet Explorer™) installed in internal memory 402d on the computer 402. When the user at station 402 encounters the web page with the CONTAINER 418, typically seen as OBJECT A referring to the CONTAINER 418, the SYSTEM EXTENSION 422 and VIEWER 424 permit viewing of the OBJECT "A." The author's name can also be displayed, if desired, through the METADATA and as specified by the author at station 410.

Note, again, that because the CONTAINER 418 is integrated with object controls utilizing ActiveX™, or similar object control, the CONTAINER 418 need not comprise data that is resident at the same location. Rather, a CONTAINER can include data that is spread across the network 406 or Internet 408. Because the CONTAINER 418 is formed with object-based controls, when user station 402 encounters the web page at site 430 that refers to the CONTAINER 418, the computer 402 first interrogates its registry to see if that control is available internally. If not, the computer automatically finds and installs the control over the Internet 408 based upon the address specified by the author at station 410.

The user at station 412 represents an author and a user of CONTAINERs. In particular, user station 412 has a SYSTEM EXTENSION 422 within internal memory 412d so that it can access the CONTAINER 418 at web site 430. In this example, the user at station 412 chooses to edit the CONTAINER 418 through use of the PACKAGER 416, also resident in memory 412d, so that the CONTAINER 420 contains both digital creative works 412a and METADATA as selected by the user at station 412. The work 412a is illustratively shown as "A+B" in FIG. 1.

Accordingly, the work 412a created at station 412 is "derivative" in nature, since it derives from previous artistic work (i.e., the work 410a) of the author at station 410. The invention keeps track of the derivative uses and edits of digital creative works in a source works file disposed within the METADATA, as described herein.

In this example, the user at station 412 chooses to register the work 412a with the Registry 426. Accordingly, the user at station 412 first initiates a registration request to communicate and request registration of CONTAINER 420. Depending on the type of work 412a, the user at station 412 can select a corresponding property page template to identify and select certain METADATA as associated with the CONTAINER 420. By way of example, any of the following information can be—or are required to be—communicated to the Registry 426, depending upon how the particular Registry is set up:

The author's name and other rights related information (attributes or properties) of the work 412a.

The aesthetic presentation of the attached information (METADATA) for the work 412a.

The balance between accessibility and locality of the CONTAINER's properties. For example, certain static METADATA, such as the author's name, can be located in the CONTAINER 420; whereas requests for volatile METADATA information, such as quantity of works 412a to be published, is generally referred to a remote server. For example, the web site 430 or station 412 can each function as such a remote server; and the author at station 412 can specify, or change, the number of published quantities of the work 412a as needed.

The minimum permissions, auxiliary permissions and requirements for use of the work 412a by any user.

The specification of other services, such as email, that are available through access to the CONTAINER 420.

The sets of attributes, presentations, and permissions that are applied to the multiple works 410a and 412a.

The specification of prototypes or templates of sets of attributes, presentations, and permissions that are formally and legally appropriate to the works 410a and 412a.

The organization of attribution and credit to the work 410a, since the work 412a is a derivative work.

The REGISTRY can have multiple templates available for different business models, different media types, and different categories of registrants.

The subsequent processing by Registry 426 in evaluating, granting and tracking permitted uses of the work 412a.

Structure to comply with the protocols established by various registries. Note that although a single Registry 426 is illustrated in FIG. 1, multiple registries are possible and intended. For example, had the user at station 410 registered the work 410a at a Registry other than Registry 426, then that Registry would require certain protocols and information (e.g., addresses) to identify that Registry and to communicate thereto.

This example is not a common occurrence whereby the original creator, user 410, chose to make an unregistered OBJECT "A". Such a creator 410 thus preferably makes the unregistered OBJECT A with "open" permissions so that the associated Work 410a can be incorporated into other works, e.g., the Work 412a. Once the derivative user 412 uses the Work 410a, then the identification of the original author, i.e., "source work", will be reflected in the source works page of the new template, if available. The onus is on the user to contact the creator by whatever means that creator lists in the property pages of the unregistered OBJECT A, possibly a phone, fax, email, or other contact. As such, an unregistered OBJECT can carry substantially all the information of a registered object.

The users at stations 410 and 412 can thus package CONTAINERs from within creativity tools, within an Application Programming Interface (API) for a particular plug-in, or directly from the shell: in the case of the user at station 410, the TOOLBOX 414 indicates that the work 410a was created from within a creativity tool such as Adobe Illustrator™; while station 412 has a PACKAGER 416 installed as a direct shell application to produce CONTAINERs. These tools, together with the registration process at the Registry 426, assure the user that the attached METADATA information is not easily removed, altered or forged. Such users are then able to catalog, share, and generally manipulate such sets in an organized way; and with a large degree of automated help from the system 400. The attached METADATA information is accessible from any representation of the works 410a and 412a, especially from a rendition of the content as well as any iconic ones.

User station 404 is very similar to the user station 402, except that the user at station 404 has accessed a registered work 412a, as opposed to the unregistered work 410a in CONTAINER 418. Accordingly, the METADATA 420b of CONTAINER 420 specifies the minimum permissions of the work 412a. Typically, for example, that minimum permissions allows the user 404 to view the work 412a on the screen 404c; yet further actions such as print, copy, drag and drop are prohibited and are not possible without a license to the work 412a. By way of example, if the user at user station 404 desires to print fifty copies of the work 412a, then a license to this activity must be negotiated through the Registry 426, where the CONTAINER 420 was registered. If the METADATA 420b permits the license of the work 412a in terms of the number of prints, then the user at station 404 can contact the Registry 426 and proceed with appropriate licensing terms.

Once created, CONTAINERs live on as data items within the Internet 408. It is likely that the individual or company which created the work associated with a particular work no longer exists relative to the Internet 408 and Registry 426. For example, one creator of Digital Creative Works is a publisher of magazines; and if that magazine goes out of business, then subsequent licenses to their works are problematic. There are several ways to deal with this problem. First, the publisher in such a situation can notify the Registry that it is going out of business and that future transactions as to their CONTAINERS are prohibited. Alternatively, the publisher can inform change the METADATA within the CONTAINER so as to unregister the CONTAINER, thereby providing a free license to the works within the CONTAINER. Note that the publisher could specify, in the METADATA, information about the publisher and suggestions for alternative contact points; and that METADATA is available to users with VIEWERS.

In a default situation, where the publisher does nothing relative to its orphaned CONTAINERs, the Registry 426 can contact the administrative site 428 to decide the fate of the CONTAINER. At that point, the administrative site can specify that no additional information is known; and, for example, that access to the CONTAINER is prohibited.

The administration site 428 also operates in default situations where the Registry does not answer. In that case, the administration site 428 can review the status of the CONTAINER and inform the requesting user to call the Registry later, for example if a temporary problem exists or if the Registry is too busy. Alternatively, the administrative site can function as an alternative Registry, if set up by the creator of the CONTAINER.

The invention thus supports commerce between the owners and creators of digital content, i.e., the Digital Creative Work. Specifically, the invention provides a method for the owner to license the work, while also providing a method for the multimedia developers and publishers to make productive use of the work's content. The invention thus provides a uniform, timely, and persistent means of identifying digital content in the networked environment.

Figure 12:
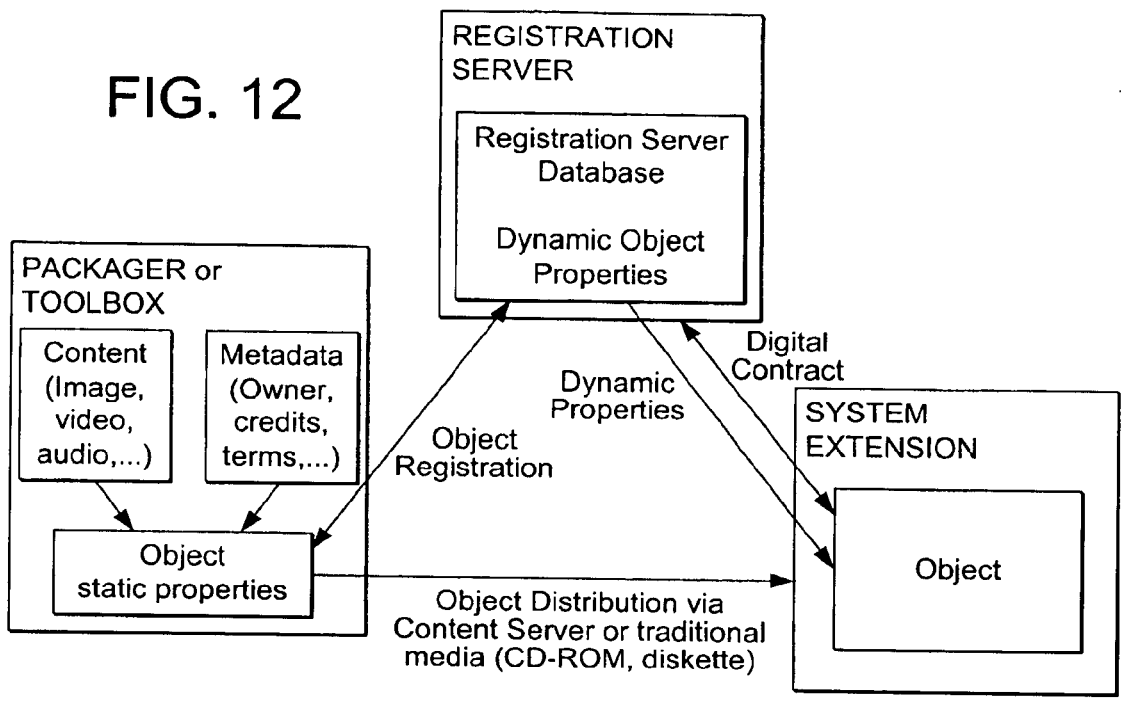
FIG. 12 schematically illustrates interaction between a PACKAGER/TOOLBOX, Registration Server, and SYSTEM EXTENSION, in accord with the invention.

In a preferred embodiment of the invention, an Internet-based application is built around the OBJECT as supported by the TOOLBOX and the Registration Server. The SYSTEM EXTENSION enables OBJECTS to be viewed on target operating systems and from within a variety of applications. Preferably, the invention incorporates object technology such as Internet-extended OLE, the standard object technology developed by Microsoft™ that allows a variety of media types to be shared by applications throughout the Internet. One such interaction, according to the invention, is illustrated in FIG. 12.

The invention also provides substantially uniform representation of content within other applications. That is, creativity tools such as graphics, sound, video, word processing, and multimedia authoring tools are presented with a substantially uniform interface to host applications, relieving those applications from the responsibility of rendering all media types. Further, the creators and owners of content (i.e., Digital Creative Works) can, with the invention, store and make available the METADATA which can be critical to licensing and other derivative uses.

Figure 13:
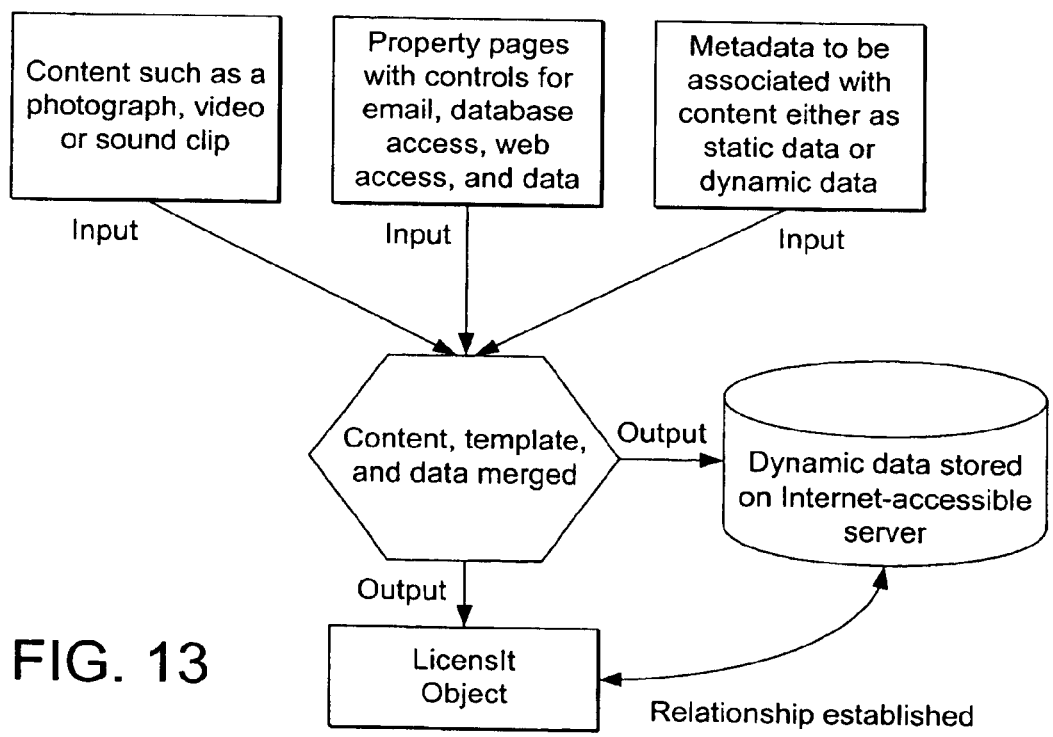
FIG. 13 schematically illustrates one packaging process flow in accord with the invention.

The invention creates documents, or CONTAINERs, through a process called packaging. The PACKAGER merges content (i.e., Digital Creative Work), Metadata, and active interface controls and presents this to the user through a set of property pages designed for the specific business problem being addressed. The result of this packaging is instantiated as an OBJECT. FIG. 13 illustrates one packaging process according to the invention. In FIG. 13, Digital Creative Work and Metadata associated with that content are combined with the desired template to create the OBJECT.

For an owner or creator, a CONTAINER is much easier to track and to manage than conventional content because the Metadata is accessible directly from the CONTAINER. Typically, the owner or creator will choose to attach a small amount of identifying data to the Digital Creative Work, with the larger and/or most volatile data being supplied to the CONTAINER from a remote registration server via the Internet. After the work is packaged as a CONTAINER, owners and creators can ensure that potential users always obtain up-to-date ownership, contact, and licensing information about specific content elements. Owners can thus be sure that the positive identification, direct communications, and possibility of automated licensing will maximize the likelihood that their content will get used in legitimate or legal derivative works.

CONTAINERs also reduce the workload of multimedia developers, publishers, and other derivative users of content by making the identification of content and its ownership substantially instantaneous and by reducing or eliminating delays, errors and misdirection when communicating with the appropriate rights management authorities.

In accord with the invention, one way to convert Digital Creative Works to CONTAINERs and OBJECTs begins with the use of a Template Editor. The Template Editor presents an interface for designing sets of properties and property pages that organize the presentation of the CONTAINER's Metadata and buttons that initiate various functions of the OBJECT. Specifically, the Template Editor enables content owners to create layouts for property pages, placing various controls on the pages. These controls can, without limitation, include:

Fields for static data that will ultimately be bound to the object

Fields for dynamic data that will ultimately be stored on a remote server

Labels for clarifying or identifying sections of the property page

Buttons for initiating an email or web access action

Buttons for retrieving dynamic data from a remote server

Other elements including illustrations, logos, or icons

Figure 14:
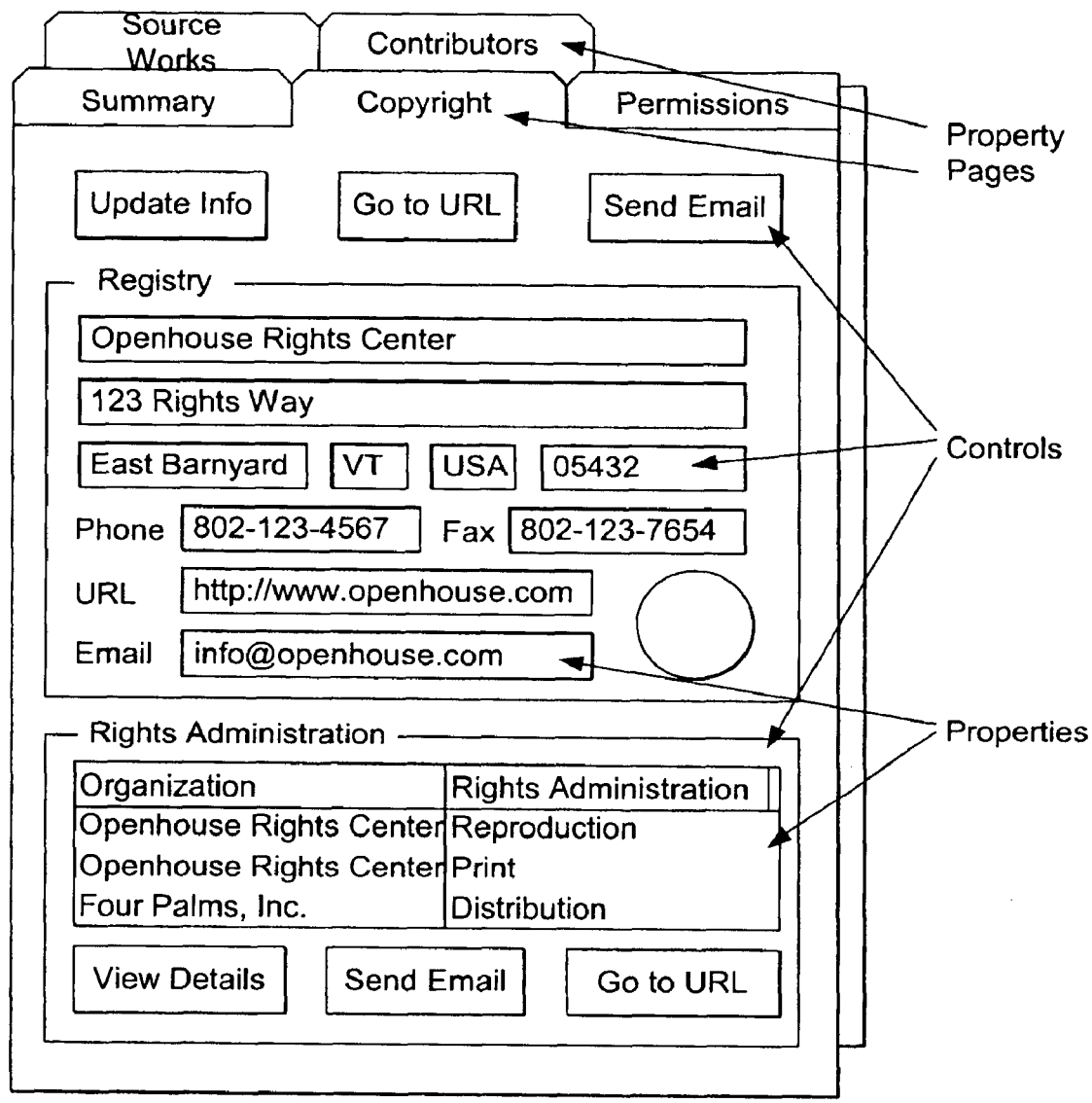
FIG. 14 shows a representative property page template constructed according to the invention.
Figure 15:
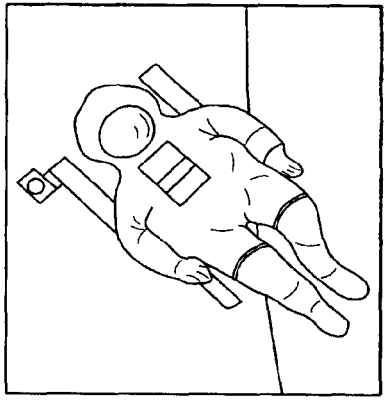
FIG. 15 illustrates a template overlaid onto an OBJECT that instantiates a CONTAINER constructed according to the invention.

One illustrative property page template is shown in FIG. 14. Another template and an associated OBJECT, instantiating a CONTAINER, is shown, representatively, in FIG. 15.

After creating the property page template, a user of the invention can employ one of several tools to make the CONTAINER: the Toolbox, the Express Packager, and the Software Developers Kit (SDK). Each tool merges the various input elements to create a CONTAINER or Object.

In one illustrative case, the user of the tool specifies the source content element (e.g., photo, sound, video, text, etc.) and the Template to be used in the packaging process. The user then supplies the data required by the Template. Once all the data is supplied, the PACKAGER, taking its basic instructions from the Template, creates the CONTAINER, binding static data to the content and automatically storing dynamic data on the designated Registration Server. The various PACKAGER tools are designed for different applications and needs:

In one configuration, the TOOLBOX is a graphical desktop tool designed for individual users packaging relatively small amounts of content. From a standard graphical user interface, the user specifies the content source file and designates the appropriate Template. The Toolbox then prompts the user for the necessary input to complete the required entries specified by the Template. Upon completion of the required entries, the Toolbox will update the associated server with dynamic data, if any, and create a CONTAINER.

The Express Packager is a batch-oriented PACKAGER tool which converts high volume content elements to CONTAINERs. When using the Express Packager, the operator specifies a set of content files, the template, and a source of the required input data. The Express Packager then automatically accepts the input and converts the files to the right format.

The SDK Packager is designed for applications where functionality according to the invention is to be built into existing content production tools. As an example, certain Internet publishers provide various "just-in-time" content delivery systems. In such a case, the SDK Packager is used whereby the publisher's existing production tools automatically invoke the packaging process to follow the same model of receiving content, template, and data as input to produce the CONTAINER.

In the process of packaging, an owner can create a registered object by communicating with the Registration Server. Alternatively, the owner can use one of the packaging tools to create an unregistered object. In such a case, static information is bound to the content but there is no record placed on a Registration Server.

The Registration Server provides the communications link to Objects. Usually, it is the creator of the Template who establishes the relationships between the dynamic data required by the Object and the Registration Server. The Registration Server listens for various types of requests entered by viewers of the content (i.e., the Digital Creative Work). Those requests can be for specific elements of data that will be displayed on property pages, or for other data that will support functions such as email or web site addressing. The requests may also include transactions that require interfacing to legacy business systems or financial transaction systems.

The Registration Server is built to respond to such requests and to interface with existing information and transaction systems. In such a role, it can:

Retrieve product information or pricing from a vendor's remote database and supply it so it can be displayed on a property page.

Retrieve content ownership, contact, and licensing information from a publisher's remote database.

Receive an incoming payment request and submit it to a third-party payment handling system.

Supply transaction activity data to an in-house marketing database.

Many institutional content owners with existing business information and transaction systems can choose to have those systems interoperate with, or as, the Registration Server. Other users, however, can opt for an Administration Server. The Administration Server is a database that contains document and business information and transaction rules pertaining to owner's distributed content. The Administration Server is used to supply this information to the Registration Server when requested by the a user interacting with an OBJECT.

Viewing OBJECTs, accessing property pages, and initiating other operations discussed above, according to the invention, requires SYSTEM EXTENSION functionality. Specifically, the SYSTEM EXTENSION acts as an extension to the user's operating system, ensuring that required functionality is available from within various applications and not just through an Internet browser. The SYSTEM EXTENSION is preferably compact, self-installing, and freely distributed via the Internet or as part of a customer's packaged solution.

As discussed above, the CONTAINER can be created by the Toolbox or Express Packager. In creating the CONTAINER, the content owner, either by way of the Toolbox or the Express Packager, associates Digital Creative Work with Metadata, such as artistic or business attribution information (credits) and permission parameters. It is intended that the invention operate with all standard digital formats for the underlying source work, including GIF, JPEG, WAV, AVI, and others. In one embodiment of the invention, the content owners edit the Metadata values or properties using a set of Property Pages as an interface. The set of required and optional properties for a particular OBJECT are defined by a Template, created using the Template Editor. The Template also describes the visual layout used in the property page presentation of the Metadata. A variety of Templates may be created and applied to different types of content and for different business or licensing models.

A content owner can also choose to create either registered or unregistered CONTAINERs. In the case of unregistered OBJECTs, all content and Metadata properties are stored in the CONTAINER itself. In the case of registered objects, the Metadata properties are typically stored in two locations: within the CONTAINER and remotely on a Registration Server. Properties stored within the CONTAINER are referred to herein as static; properties that are retrieved from a Registration Server are referred to herein as dynamic, since their values may change during the life of the CONTAINER.

If the CONTAINER is to be registered, a Template supplied by the designated Registration Server is used. That Template specifies the dynamic properties to be supplied by the user that will be transferred to and stored in the Registration Server. If an unregistered object is to be created, the content owner can select one of several default Templates or he can create a custom Template that allows static attribution information and communications with the creator/owner by email and web page access only.

Registered CONTAINERs are better suited to content that is destined for commercial use. Advantages of registration include authentication, ability to serve to the user variable data such as terms for licensing, ability to change information after distributing the object, and automated transactions. Unregistered CONTAINERs may be desirable for material with a very short life cycle (e.g., weather maps), very low value (e.g., vacation photos), or for non-commercial distribution where the user simply wants to attach identifying information and facilitate email or web page access.

The following are a few of the major features of CONTAINERs and OBJECTs, as created by the invention:

Viewing and Access—Objects can be rendered on systems where SYSTEM EXTENSION functionality is installed.

Restrictions—CONTAINERs encourage compliance with the Copyright Laws by intercepting attempts to perform certain types of operations on the Digital Creative Work (e.g., drag-and-drop, copy, save or print).

Content—The CONTAINERs can contain all standard and commonly used formats for image, sound, video, and text display.

Property Pages—Property pages adhere to standard representations consistent with the operating system and other applications. Static data is displayed on pages. Also, for Registered Objects, dynamic data can be retrieved on demand from a Registration Server.

Other security measures, described above, can be used to ensure the integrity of the CONTAINERs, preventing unauthorized and undetected modifications to the content or METADATA.

CONTAINERs provide the capability to initiate communications to a creator/owner through the following mechanisms:

Email—Email addresses can be stored in the CONTAINER's properties, and email messages can be initiated when viewing the Object's property pages. Email messages can be edited and transmitted a number of ways including SMTP (direct Internet mail protocol), MAPI (Mail API) or by launching a user's configured email client application (e.g., Eudora or Microsoft Exchange).

Web page access—URLs can be stored in the CONTAINER's properties, and a web browser such as Netscape Navigator™ or Microsoft Internet Explorer™ can be launched to access the specified page.

Registration Server transactions—Registered CONTAINERs can initiate a variety of transactions with a Registration Server. Transactions include the retrieval of Dynamic Properties, the completion of a Permission Contract, and payment for licensing fees. These transactions can be authenticated using cryptographic techniques.

SYSTEM EXTENSION functionality provides the necessary functions to allow a user to render an OBJECT and to access property pages and functions. It is generally provided (e.g., "delivered") as an extension to the operating system. The SYSTEM EXTENSION is intended to be widely and freely distributed online and through traditional distribution media such as CD-ROMs and diskettes. Such extensions should have the following properties:

Compact—The Extensions will often be loaded electronically by a user through a web-page or FIP server.

Self-installing—The Extension can be installed with little or no interaction.

Self-updating—Updates required for subsequent releases will be automatically detected and installed.

Backward Compatible—New Versions of the Extension will always be able to view and use older OBJECTS.

Forward Compatible—Objects with new formats and capabilities, created with newer versions of the Toolbox and Express Packager, can be viewed with older versions of the System Extension. The older System Extension can, for example, ignore new features or functionality supported by the newer Objects. This is analogous to viewing web pages using newer HTML extensions (e.g., tables or frames) with older browsers.

Figure 16:
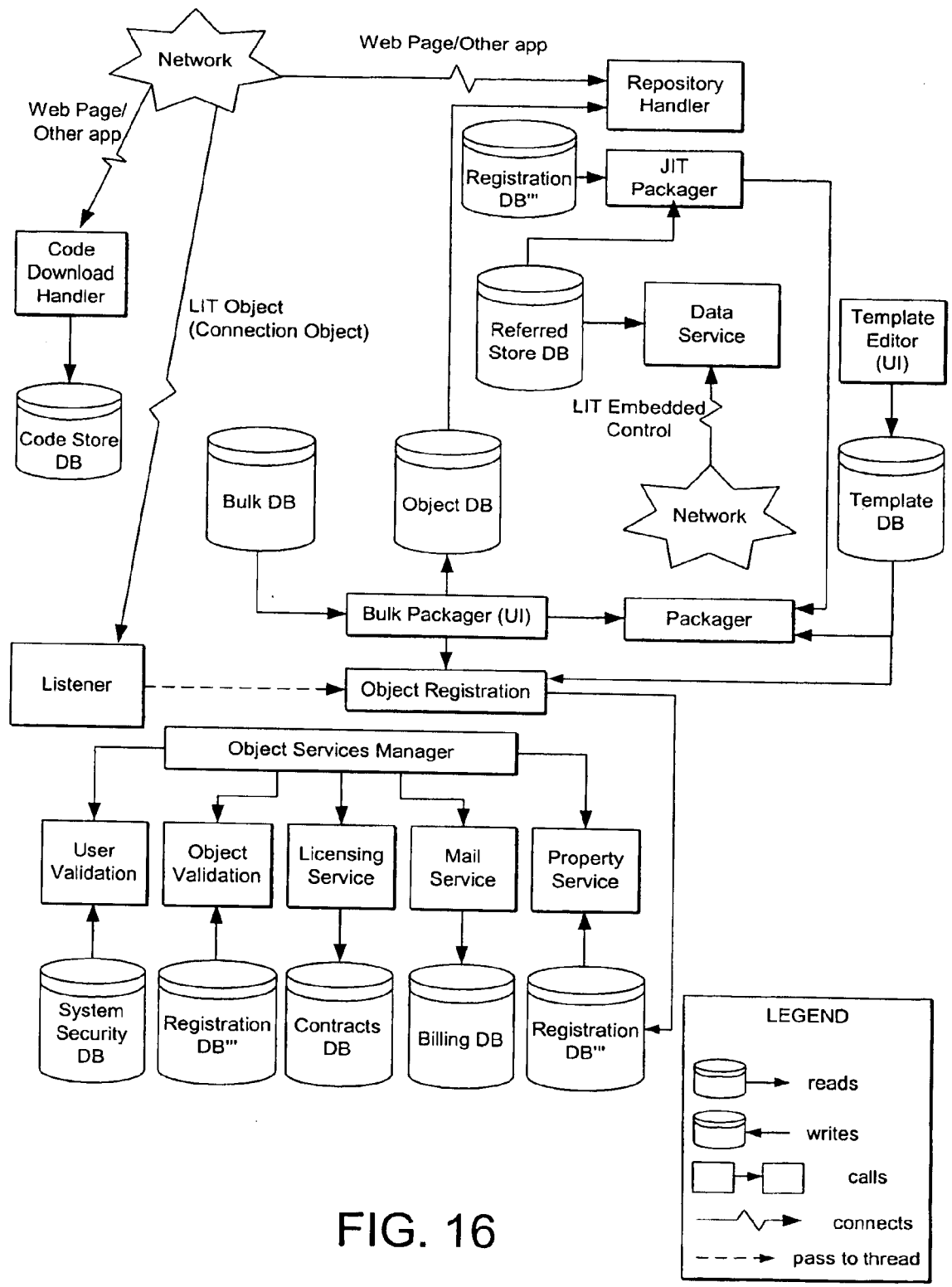
FIG. 16 schematically shows a registration server system constructed according to the invention.

The Registration Server is the storage and administrative facility for registered CONTAINERs. A registration server is the primary component required for organizations running a REGISTRY. A REGISTRY is, for example, analogous to a Web site, except that instead of sending HTML pages and responding to requests with the HTTP protocol, the REGISTRY is interacting across a network with OBJECTS. A REGISTRY can include a batch or real-time link to an organization's legacy permission or rights management system. The major functions of the Registration Server can, without limitation, include:

- Object Registration—The Registration Server is the where the dynamic properties for a registered CONTAINERs are stored. These properties can be updated by the Registration Server administrator when necessary. Objects retrieving these properties will immediately reflect the updated values.
- Template Creation—The Template Editor provides the operator of a registration server with the ability to create and customize Templates, including the layout of property pages and the definition of the static and dynamic properties to be associated with Objects. Templates can be organized and grouped for distribution to creators/owners for use with the Toolbox or the Express Packager.
- Creator/Owner Registration—Several options are available for initiating a relationship with a creator/owner depending upon the business model adopted by the operator of a registration server. These options range from assigning a simple user account name and password to a sophisticated high-security procedure using officially certified digital signatures.
- External System Linkages—The Registration Server can interface to existing rights management systems through one of several mechanisms:
  - The Express Packager allows one-way batch creation of Objects.
  - The Packaging API allows real-time creation of Objects. The API is two-way, enabling the update of data in the external system based on changes made to the Registration Server.
  - The Registration Server Database Mapper allows a direct interface from the Server to an existing external database. The Mapper allows a flexible mapping of the Object Properties to legacy systems.
- The Report Writer—Pre-formatted and customized reports are available, including the following classes of reports:
  - Registered Object Reports
  - Creator/Owner Account Reports
  - Inquiry and Permission Transaction Reports
  - Server Activity Reports
  - Systems Operation Reports One exemplary Registration Server schematic is shown in FIG. 16.

The Registration Server also provides for certain problem situations that may arise with Objects.

- Servicing Objects for which the Registration Server record has been removed or transferred. If ownership has been transferred, then a transaction request may simply be redirected to the appropriate server. A special "backstop" server can be provided so that an Object contact the backstop server if all other attempts to locate the appropriate Registration Server fail. This server includes a master directory of Registration Servers. If the relationship between the creator and the Registration Server has terminated, then an appropriate notification will be returned.
- Servicing Objects which submit requests that for one reason or another violate an authenticity check. If the server receives any unusual transaction requests, including requests indicating an authentication failure, then an audit trail will be maintained.

The Administration Server is an add-on component for operators of the Registration Server. The Administration Server, for example, serves small publishers, service bureaus, and independent professionals who do not have existing methods for administering royalties, handling on-line financial transactions, and reporting on the financial and administrative activity of the system. The Administration Server brings some of the necessary publishing functionality to the small user.

As discussed above, the packaging process associates Metadata with Digital Creative Works and instantiates the CONTAINER as an Object. In one method of the invention, the METADATA is displayed by means of its property pages; the properties required on these pages and their layout is specified by the object's property page template. Templates can be used for both registered and unregistered Objects, but are of special importance when an OBJECT is registered.

The Template Editor enables the operator of a Registration Server to create and customize templates, including the layout of property pages and the definition of the static and dynamic properties to be associated with Objects. Templates may be organized and grouped for distribution to creators and owners for use with the Toolbox or the Express Packager. The Template Editor preferably has a GUI with a palette-oriented desktop motif consistent with current visual software design tools (e.g.: Visual Basic).

A Template contains a hierarchy of data items, including, without limitation, the following:

- A collection of property pages.
- For each property page, a collection of controls that will appear on that page.
- For each property page, a collection of property sets. A property set is a collection of property descriptors that define the attributes of each property.
- The definition of the template's home Registration Server.
- The definition of the template's connection object.

The Template Editor gives the user the tools to define property sets and their associated property descriptors. Each descriptor is uniquely identified upon creation. Each property page interface is built from a set of controls. The user selects each control from a palette and draws on a form in a fashion similar to Visual Basic. For each control selected, the user can define a new property descriptor to be associated with the control or may select from a set of "hard-coded" routines that the selected control can execute. Each control is assigned a unique identifier upon creation.

After the user has created property pages and property sets, the user can save everything as a Template that can be inserted into another Template Editor project. Alternatively they may save the work as a bound template that can be used directly by a packaging tool to create Objects. Prior to saving the user's work as a bound Template, the Template Editor automatically generates an input data form that may be optionally edited. When saving as a bound template, the template editor generates a fixed-format input data file that will be parsed by the PACKAGER.

The Express Packager is used by content owners who convert large amounts of content into CONTAINERs by automatically merging Metadata and Digital Creative Work. The Express Packager creates registered and unregistered Objects and generally has two modes of operation:

Conversion Mode enables large numbers of existing digital files to be converted into CONTAINERs. When operating in conversion mode, the Express Packager actively gets the content and the input data file that describes the Metadata and creates the CONTAINER. Data is either retrieved from a database or from a text file or other intermediate container storing the pertinent information.

Creation Mode enables the Express Packager to operate under the control of another program through the real-time Packaging API (LPAPI). In this way, the Express Packager operates in a passive mode, taking its instructions from other applications. This mode is appropriate for packaging content that is created in real-time such as the output from Java applications, CGI scripts, proprietary publishing applications, etc.

The LPAPI can be made available through an OLE Automation interface to enable a flexible and industry-standard protocol used to create and register Objects. The LPAPI allows custom interactive or batch interfaces to be built using a large array of development and scipting tools such as Visual Basic, C++, Microsoft Office applications, and other similar applications.

The LPAPI can also be made available "off the shelf" for use in applications such as web servers (CGI, ISAPI), browsers (Java, ActiveX, plug-ins) and third party programs such as creativity tools and multimedia development systems.

The Toolbox can be used by content owners to interactively create CONTAINERs. The Toolbox focuses on ease-of-use through an intuitive interface with on-line help, wizards, and other supporting mechanisms. The Toolbox can create registered and unregistered CONTAINERs. The Toolbox combines Templates provided by the Registry for registered objects, or by other means for unregistered objects. Some Registries can choose to use standard Templates. The Template Editor is useful, for example, for creators who are using Registries that allow Objects to be registered with custom templates that are derived from those supplied by the Registry. This provides the Registry with the capacity to allow creators to add additional properties that complement those required by the Registry. The Toolbox can use cryptographic techniques to ensure the integrity of the CONTAINER and to provide two-way authentication of the parties involved in object registration.

Appendix A contains, for disclosure purposes, source code which illustrates certain operational aspects of the invention. Appendix B contains—for disclosure purposes, and without limitation to the above-described invention—further descriptions of alternative and supplemental object-based system parameters which can be used in accord with the invention.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. A method of providing auxiliary permissions from a computer server to a remote computer, the computer server operating to at least manage a digital copyrighted work, said method comprising:

communicating with a remote computer, the remote computer including a processor and memory, the remote computer further including the digital copyrighted work in a packaged form stored in the memory, the packaged form including a secure digital container having a set of minimum permissions, the remote computer further comprising a software application executing on the processor to utilize the set of minimum permissions to help govern access to the digital copyrighted work according to limits imposed by the set of minimum permissions, wherein the access is less than unrestricted access to the digital copyrighted work;

receiving a request from the remote computer for expanded access to the digital copyright work; and if the remote computer signals an acceptance of terms for the expanded access to the digital copyrighted work, then;

communicating an auxiliary permission to the remote computer, the software application using the auxiliary permission to expand the access to the digital copyrighted work through the remote computer.

2. The method of claim 1 wherein the set of minimum permissions provides restricted access to a form of the digital copyrighted work.

3. The method of claim 2, wherein the auxiliary permission enables expanded access to the form of the digital copyrighted work.

\* \* \* \* \*